(12) United States Patent
Kasahara

(10) Patent No.: US 9,355,496 B2
(45) Date of Patent: May 31, 2016

(54) IMAGE PROCESSING APPARATUS, IMAGE PROCESSING METHOD, AND MEDIUM TO DISPLAY AUGMENTED REALITY OBJECTS

(75) Inventor: Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 176 days.

(21) Appl. No.: 14/235,830

(22) PCT Filed: Aug. 15, 2012

(86) PCT No.: PCT/JP2012/005160
§ 371 (c)(1),
(2), (4) Date: Jan. 29, 2014

(87) PCT Pub. No.: WO2013/051180
PCT Pub. Date: Apr. 11, 2013

(65) Prior Publication Data
US 2014/0193038 A1    Jul. 10, 2014

(30) Foreign Application Priority Data

Oct. 3, 2011 (JP) ................................. 2011-219203

(51) Int. Cl.
*G06K 9/00* (2006.01)
*G06T 19/00* (2011.01)
*G06K 9/22* (2006.01)
*G06K 9/62* (2006.01)

(52) U.S. Cl.
CPC .......... *G06T 19/006* (2013.01); *G06K 9/00671* (2013.01); *G06K 9/228* (2013.01); *G06K 9/6202* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 4,906,940 A * | 3/1990 | Greene et al. | ................. | 382/100 |
| 5,528,698 A * | 6/1996 | Kamei et al. | ................. | 382/100 |
| 6,182,083 B1 * | 1/2001 | Scheifler et al. | | |
| 6,199,015 B1 * | 3/2001 | Curtwright et al. | ........... | 701/455 |
| 6,272,247 B1 * | 8/2001 | Manickam et al. | ........... | 382/217 |
| 6,338,059 B1 * | 1/2002 | Fields et al. | .................. | 715/208 |
| 6,400,845 B1 * | 6/2002 | Volino | .......................... | 382/176 |
| 6,651,217 B1 * | 11/2003 | Kennedy et al. | .............. | 715/224 |
| 6,778,703 B1 * | 8/2004 | Zlotnick | ....................... | 382/218 |
| 6,886,136 B1 * | 4/2005 | Zlotnick et al. | ............... | 715/780 |
| 8,463,073 B2 * | 6/2013 | Ma et al. | ....................... | 382/289 |

(Continued)

FOREIGN PATENT DOCUMENTS

| | | |
|---|---|---|
| JP | 08-197001 A | 8/1996 |
| JP | 2003-345819 A | 12/2003 |

(Continued)

OTHER PUBLICATIONS

"Pattern Recognition as a Key Technology for the Next Generation of User Interfaces," Matthias Rauterberg et al, IEEE International Conference on Systems, Man, and Cybernetics, 1996, vol. 4, Oct. 14-17, 1996, pp. 2805-2810.*

*Primary Examiner* — Wenpeng Chen
(74) *Attorney, Agent, or Firm* — Chip Law Group; Pramod Chintalapoodi

(57) ABSTRACT

An information processing system acquires an image captured by an image pickup unit and one or more templates where each template includes one or more fields. The acquired image is then compared to the templates and a result based on the comparison is generated such that the result indicates whether recognition of the fields of the templates was successful.

25 Claims, 19 Drawing Sheets

(56) References Cited

U.S. PATENT DOCUMENTS

| | | | |
|---|---|---|---|
| 8,526,743 B1* | 9/2013 | Campbell et al. | 382/218 |
| 8,732,605 B1* | 5/2014 | Falaki | 715/780 |
| 8,996,594 B2* | 3/2015 | Monsarrat | 707/899 |
| 2002/0106128 A1* | 8/2002 | Zlotnick | 382/224 |
| 2002/0159643 A1* | 10/2002 | DeYong et al. | 382/228 |
| 2004/0213437 A1* | 10/2004 | Howard et al. | 382/115 |
| 2005/0021673 A1* | 1/2005 | Frohlich et al. | 709/218 |
| 2006/0015342 A1* | 1/2006 | Kurzweil et al. | 704/260 |
| 2007/0168382 A1* | 7/2007 | Tillberg et al. | 707/102 |
| 2007/0206221 A1* | 9/2007 | Wyler et al. | 358/1.15 |
| 2007/0256005 A1* | 11/2007 | Schneider et al. | 715/507 |
| 2008/0065634 A1* | 3/2008 | Krinsky | 707/6 |
| 2008/0141117 A1* | 6/2008 | King et al. | 715/238 |
| 2009/0022394 A1* | 1/2009 | Banerjee et al. | 382/164 |
| 2009/0092320 A1* | 4/2009 | Berard et al. | 382/209 |
| 2009/0276318 A1* | 11/2009 | Broadbent et al. | 705/14.64 |
| 2010/0048242 A1* | 2/2010 | Rhoads et al. | 455/556.1 |
| 2010/0268720 A1* | 10/2010 | Spivack et al. | 707/756 |
| 2010/0328316 A1* | 12/2010 | Stroila et al. | 345/441 |
| 2011/0161076 A1* | 6/2011 | Davis et al. | 704/231 |
| 2011/0213664 A1* | 9/2011 | Osterhout et al. | 705/14.58 |
| 2011/0280451 A1* | 11/2011 | Sarkar | 382/112 |
| 2011/0313653 A1* | 12/2011 | Lindner | 701/201 |
| 2012/0063688 A1* | 3/2012 | Honma et al. | 382/218 |
| 2012/0070085 A1* | 3/2012 | Arn | 382/173 |
| 2012/0083294 A1* | 4/2012 | Bray et al. | 455/466 |
| 2012/0099780 A1* | 4/2012 | Smith et al. | 382/136 |
| 2013/0202213 A1* | 8/2013 | Adamek et al. | 382/201 |
| 2015/0127565 A1* | 5/2015 | Chevalier et al. | 705/319 |

FOREIGN PATENT DOCUMENTS

| | | | | |
|---|---|---|---|---|
| JP | 2009-087087 A | | 4/2009 | |
| JP | 2009-521134 A | | 5/2009 | |
| JP | 2009-130697 A | | 6/2009 | |
| JP | 2011-013960 A | | 1/2011 | |
| JP | 2011-081557 A | * | 4/2011 | G06F 3/048 |
| WO | WO 2011/158352 A1 | | 12/2011 | |

* cited by examiner

: RECOGNITION SUCCESSFUL     : RECOGNITION FAILED

☐ : RECOGNITION FAILED

HIGH QUALITY IMAGE

INPUT IMAGE AND INDICATION

IMAGE PROCESSING APPARATUS, IMAGE PROCESSING METHOD, AND MEDIUM TO DISPLAY AUGMENTED REALITY OBJECTS

TECHNICAL FIELD

The present disclosure relates to an image processing apparatus, an image processing method, and a program.

BACKGROUND ART

In recent years, attention has been focused on a technology called augmented reality (AR) that presents additional information to the user by overlaying such information onto the real world. The information presented to the user by AR technology is visualized using virtual objects of a variety of forms, such as text, icons, and animations.

JP 2011-081557A is one example of a document relating to the displaying of AR objects. In the technology disclosed in the cited publication, AR objects are displayed at positions associated with real objects present in the real world.

CITATION LIST

Patent Literature

PTL 1: JP 2011-081557A

SUMMARY

Technical Problem

In many AR applications, AR objects are selected and laid out based on image recognition that uses an input image. This means that the composition of the input image (which depends on the viewing angle, zoom position, camera orientation, and the like) affects the effective operations of an AR application. Accordingly, if image recognition could be carried out while having the user adjust the composition of the input image, it would become possible to provide helpful information to the user with higher reliability.

Solution to Problem

An information processing system that acquires an image captured by an image pickup unit; acquires one or a plurality of templates each including one or a plurality of fields; compares the image to the one or plurality of templates; and outputs a result based on the comparison, the result indicating whether recognition of each of the one or plurality of fields of the one or plurality of templates was successful.

An information processing method performed by an information processing system, the method comprising: acquiring an image captured by an image pickup unit; acquiring one or a plurality of templates each including one or a plurality of fields; comparing the image to the one or plurality of templates; and outputting a result based on the comparison, the result indicating whether recognition of each of the one or plurality of fields of the one or plurality of templates was successful.

A non-transitory computer-readable medium including computer program instructions, which when executed by an information processing system, cause the information processing system to perform a method, the method comprising: acquiring an image captured by an image pickup unit; acquiring one or a plurality of templates each including one or a plurality of fields; comparing the image to the one or plurality of templates; and outputting a result based on the comparison, the result indicating whether recognition of each of the one or plurality of fields of the one or plurality of templates was successful.

According to the embodiments described above, it is possible for an AR application to provide useful information to the user more reliably.

DESCRIPTION OF EMBODIMENTS

Figure 1:
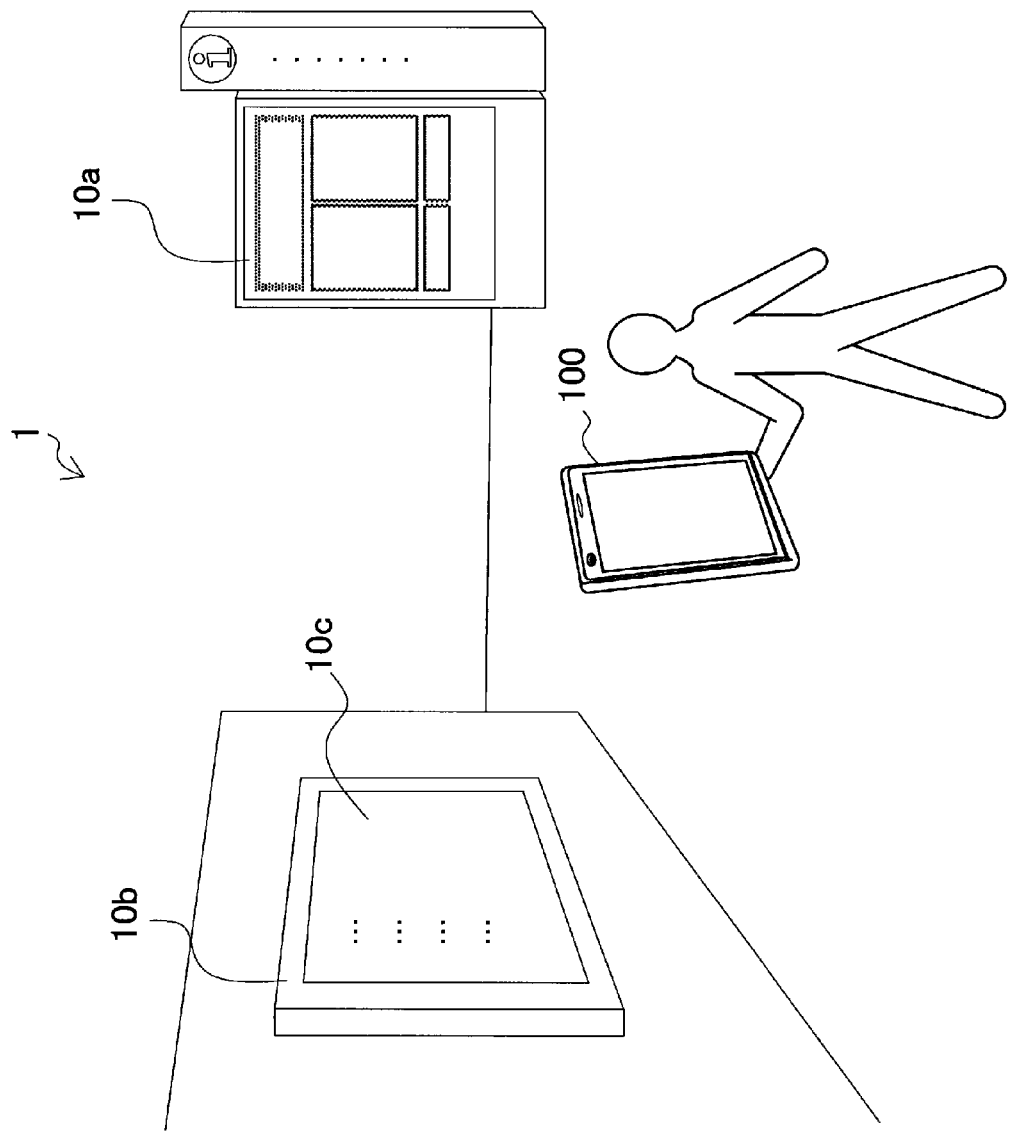
FIG. 1 is a diagram useful in explaining an overview of an image processing apparatus according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview
2. Example Configuration of Image Processing Apparatus According to Embodiment of the Present Disclosure
   2-1. Hardware Configuration
   2-2. Functional Configuration
   2-3. Flow of Processing
3. Conclusion 1. Overview FIG. 1 is a diagram useful in explaining an overview of an embodiment of the present disclosure. FIG. 1 shows an image processing apparatus 100 that is carried by a user in the real world 1.

The image processing apparatus 100 is an apparatus displaying images produced by image pickup of the real world on a screen. The image processing apparatus 100 may be a terminal apparatus such as a smartphone, a PDA (Personal Digital Assistant), a PND (Portable Navigation Device), a game console, or a portable music player, or may be an information processing apparatus such as a PC (Personal Computer) or a workstation.

The real world 1 is one example of a space in which the image processing apparatus 100 may be used. Real objects 10a and 10b are present in the real world 1. The real object 10a is a real object that provides navigation information. As examples, the real object 10a may be a notice board used to display train connections at a station, a roadside notice board for traffic or route information, or a poster used as a store guide in a commercial building. The real object 10b is an information appliance that displays an image 10c. As examples, the real object 10b may be a digital signage monitor, a PC (Personal Computer), a smartphone, or a television set. The image 10c is a displayed object that provides some kind of information to the user.

In the present embodiment, the navigation information provided by the real object 10a is visualized so as to have a visible structure that is common to navigation information of the same type. As one example, in terms of appearance, notice boards set up at A station, B station, and C station will have a common structure. Accordingly, only the content of the information shown by such notice boards will differ. The image processing apparatus 100 shown in FIG. 1 uses a template, described later, to recognize the structure of the real object 10a and identify the real object 10a. In the same way, the image 10c displayed by the real object 10b is visualized so as to have a visible structure that is common to image information of the same type. As one example, in terms of appearance, web pages of individual restaurants on a website that provides restaurant information will have a common structure. Accordingly, only the content of the information provided by such individual web pages will differ. The image processing apparatus 100 shown in FIG. 1 recognizes the structure of this type of image 10c using a template, described later, to identify the image 10c. The image processing apparatus 100 then realizes a variety of AR applications based on the identification result for such objects.

Figure 2:
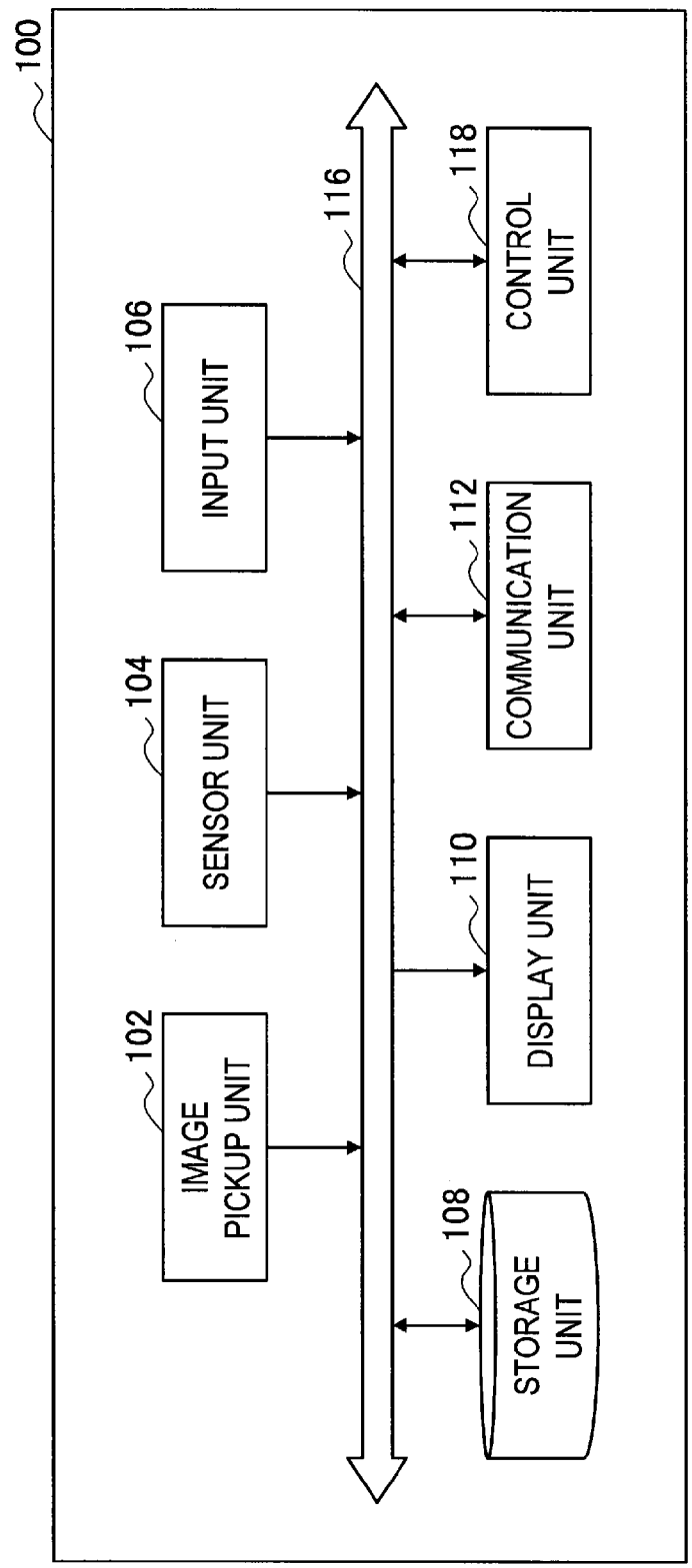
FIG. 2 is a block diagram showing one example of the hardware configuration of the image processing apparatus according to the same embodiment.

2. Example Configuration of Image Processing Apparatus According to Embodiment of the Present Disclosure 2-1. Hardware Configuration FIG. 2 is a block diagram showing one example of the hardware configuration of the image processing apparatus 100 according to the present embodiment. As shown in FIG. 2, the image processing apparatus 100 includes an image pickup unit 102, a sensor unit 104, an input unit 106, a storage unit 108, a display unit 110, a communication unit 112, a bus 116, and a control unit 118.

(1) Image Pickup Unit

The image pickup unit 102 is a camera module that picks up an image. The image pickup unit 102 picks up an image of the real world using an image pickup element such as a CCD (Charge Coupled Device) or a CMOS (Complementary Metal Oxide Semiconductor) to generate a picked-up image. The picked-up image generated by the image pickup unit 102 is an input image for image processing by the control unit 118. Note that the image pickup unit 102 does not need to be part of the image processing apparatus 100. As one example, an image pickup apparatus connected to the image processing apparatus 100 wirelessly or using wires may be treated as the image pickup unit 102.

(2) Sensor Unit

The sensor unit 104 may include a variety of sensors such as a positioning sensor, an acceleration sensor, and a gyrosensor. For example, the sensor unit 104 may include a GPS sensor that receives GPS (Global Positioning System) signals and measures the global position of the image processing apparatus 100. The sensor unit 104 may include a positioning sensor that measures the position of the image processing apparatus 100 based on the strength of wireless signals received from a wireless access point or points.

(3) Input Unit

The input unit 106 is an input device used by the user to operate the image processing apparatus 100 or to input information into the image processing apparatus 100. As one example, the input unit 106 may include a touch sensor that detects touches made by the user on the screen of the display unit 110. In place of (or in addition to) this, the input unit 106 may include a pointing device such as a mouse or a touch pad. In addition, the input unit 106 may include another type of input device such as a keyboard, a keypad, a button or buttons, or a switch or switches.

(4) Storage Unit

The storage unit 108 is constructed of a storage medium such as a semiconductor memory or a hard disk drive and stores programs and data for processing by the image processing apparatus 100. The data stored by the storage unit 108 may include picked-up image data, sensor data, and data in a variety of databases (DB), described later. Note that instead of being stored in the storage unit 108, some of the programs and data described in the present specification may be acquired from an external data source (as examples, a data server, network storage, or an external memory).

(5) Display Unit

The display unit 110 is a display module including a display such as an LCD (Liquid Crystal Display), an OLED (Organic Light-Emitting Diode), or a CRT (Cathode Ray Tube). As one example, the display unit 110 is used to display an image of an AR application generated by the image processing apparatus 100. Note that the display unit 110 also does not need to be part of the image processing apparatus 100. As one example, a display apparatus connected to the image processing apparatus 100 wirelessly or using wires may be treated as the display unit 110.

(6) Communication Unit

The communication unit 112 is a communication interface that serves as a mediator for communication by the image processing apparatus 100 with other apparatuses. The communication unit 112 supports an arbitrary wireless communication protocol or wired communication protocol and establishes a communication connection with other apparatuses.

(7) Bus

The bus 116 connects the image pickup unit 102, the sensor unit 104, the input unit 106, the storage unit 108, the display unit 110, the communication unit 112, and the control unit 118 to one another.

(8) Control Unit

The control unit 118 corresponds to a processor such as a CPU (Central Processing Unit) or a DSP (Digital Signal Processor). By executing a program stored in the storage unit 108 or another storage medium, the control unit 118 causes the image processing apparatus 100 to function in a variety of ways as described later.

2-2. Functional Configuration

Figure 3:
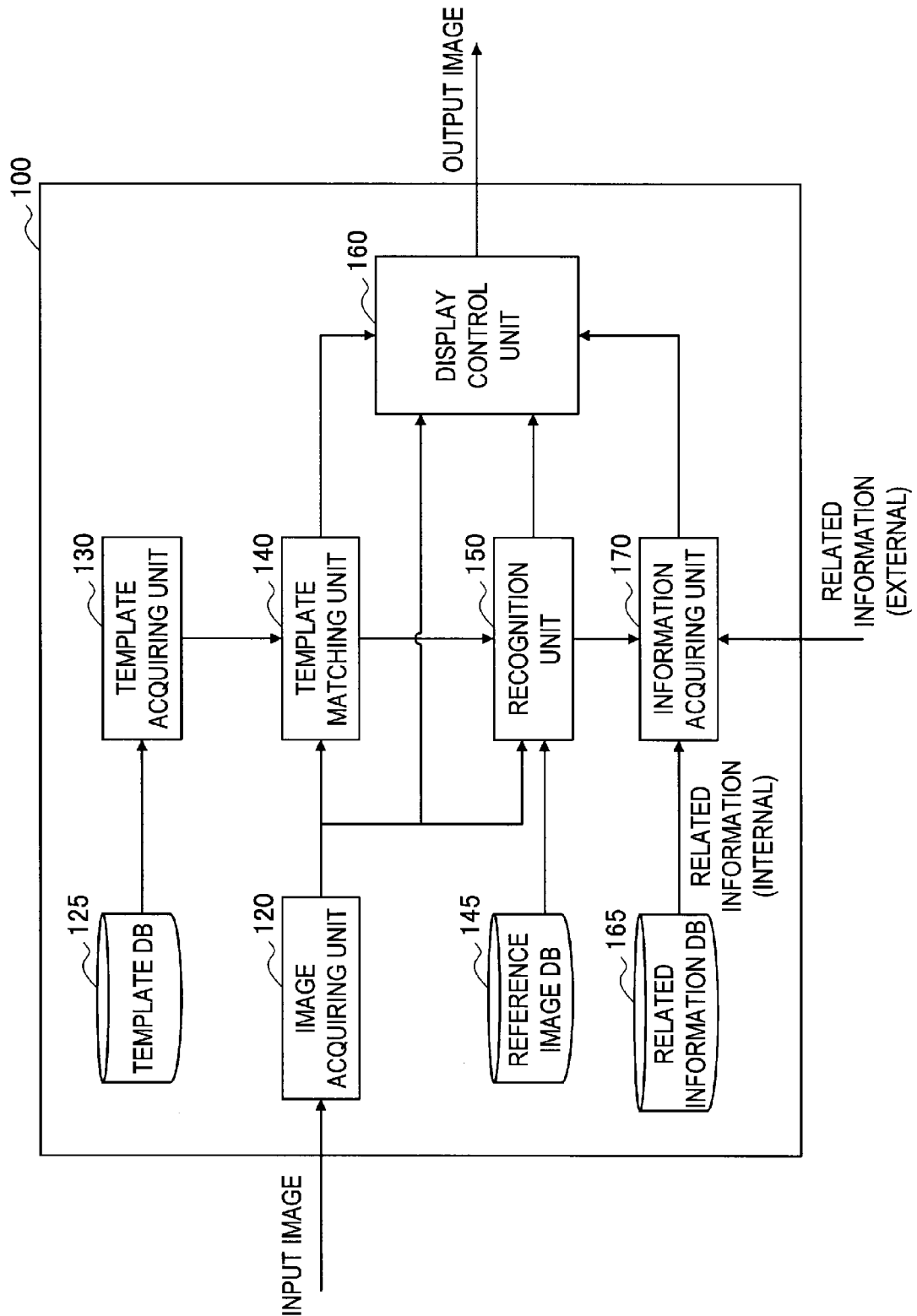
FIG. 3 is a block diagram showing one example of the logical functional configuration of the image processing apparatus according to the same embodiment.

FIG. 3 is a block diagram showing one example of a logical functional configuration realized by the storage unit 108 and the control unit 118 of the image processing apparatus 100 shown in FIG. 2. As shown in FIG. 3, the image processing apparatus 100 includes an image acquiring unit 120, a template database (DB) 125, a template acquiring unit 130, a template matching unit 140, a reference image DB 145, a recognition unit 150, an display control unit 160, a related information DB 165, and an information acquiring unit 170.

(1) Image Acquiring Unit

The image acquiring unit 120 acquires the picked-up image generated by the image pickup unit 102 as an input image. The input image acquired by the image acquiring unit 120 is an image produced by image pickup of the real world. Each input image may be a still image or may be a frame that composes video images. The image acquiring unit 120 outputs the acquired input image to the template matching unit 140, the recognition unit 150, and the display control unit 160.

(2) Template DB

The template DB 125 is a database storing a plurality of templates which each express the structure of an object with a visible structure in the real world. The templates may typically be defined for each type of object. For example, templates may be defined in advance for various types of object such as a notice board used to display train connections, a roadside notice board for traffic or route information, a poster used as a store guide, and a web page that provides restaurant information. In the present embodiment, each template stored in the template DB 125 includes at least one field and each field is associated with information that is visualized by the corresponding object. One or a plurality of fields included in each template is/are identification fields and is/are associated with information that enables an object to be uniquely identified.

In the present specification, the expression "identification of an object" refers to specifying a specific object out of a plurality of objects that visualize respectively different information. As one example, the specifying of a notice board set up in a particular station out of the notice boards set up in each of station A, station B, and station C is expressed using the expression "identification of an object". Three examples of templates that may be stored by the template DB 125 will now be described with reference to FIGS. 4A to 6B.

(2-1) First Example

Figure 4A:
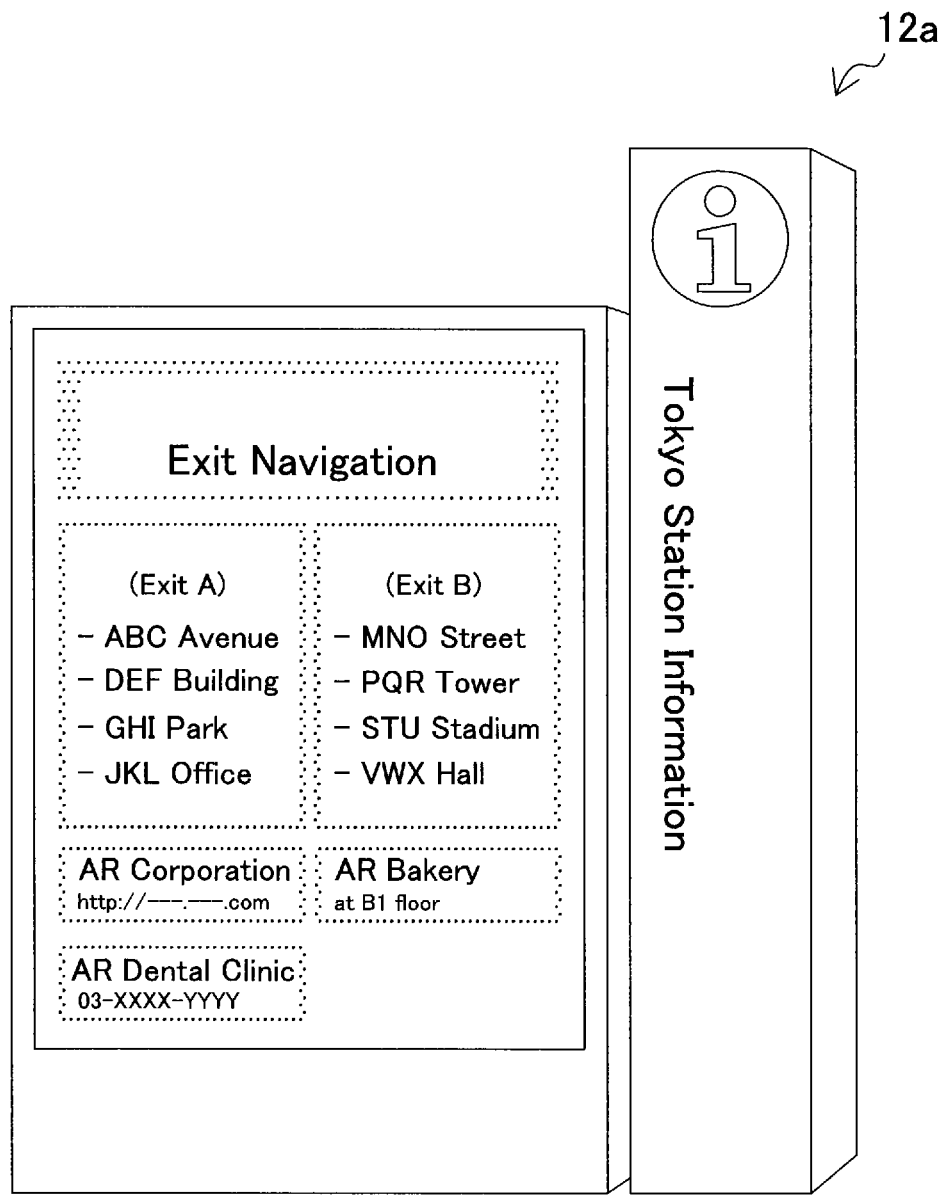
FIG. 4A is a diagram useful in explaining a first example of an object appearing in an input image.
Figure 4B:
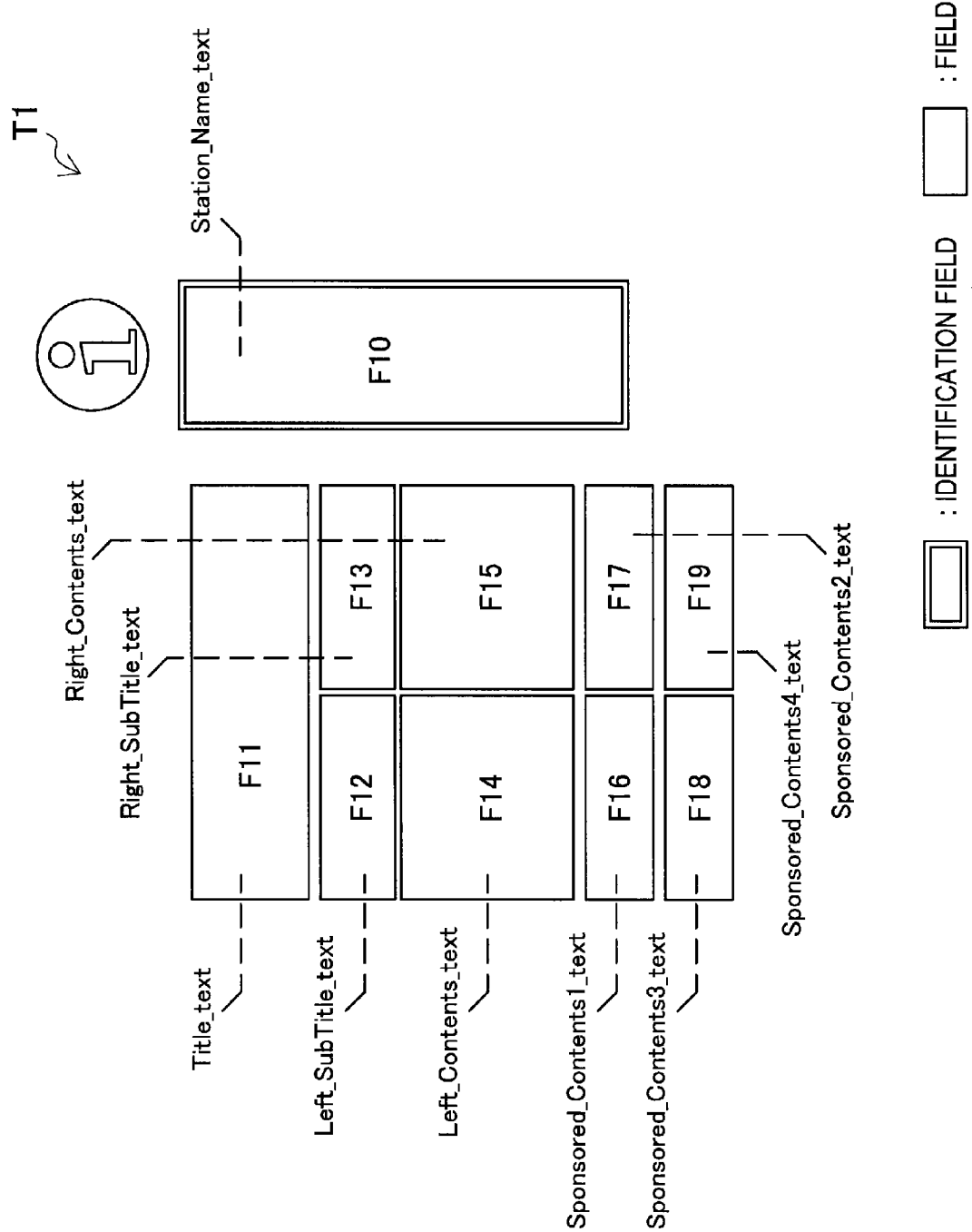
FIG. 4B is a diagram useful in explaining one example of a template corresponding to the object illustrated in FIG. 4A.

FIG. 4A is a diagram useful in explaining a first example of an object appearing in an input image. FIG. 4B is a diagram useful in explaining one example of a template corresponding to the object illustrated in FIG. 4A.

An object 12a shown in FIG. 4A is a guidance notice board at a station. The object 12a includes a pillar-shaped portion on which a station name is written and a board-shaped portion on which guidance information is written. On the board-shaped portion on the left in FIG. 4A, the guidance information is written having been divided into a plurality of sections.

The template T1 shown in FIG. 4B is a template showing the visible structure of the object 12a that is a real object present in the real world. The template T1 includes ten fields F10 to F19. The field F10 (Station_Name_text) is an identification field and is associated with a station name. The field F11 (Title_text) is a regular field and is associated with a heading character string. The fields F12 (Left_SubTitle_text) and F13 (Right_SubTitle_text) are regular fields and are associated with sub-heading character strings. The fields F14 (Left_Contents_text) and F15 (Right_Contents_text) are regular fields and are associated with the content of the guidance information. The fields F16 to F19 are regular fields and are associated with advertising information. The template may be data that defines the positional relationship between such one or more fields and the attributes of the respective fields. The template may also include images of characters, marks, and the like that are commonly included in corresponding objects (for example, the "i" mark in template T1).

(2-2) Second Example

Figure 5A:
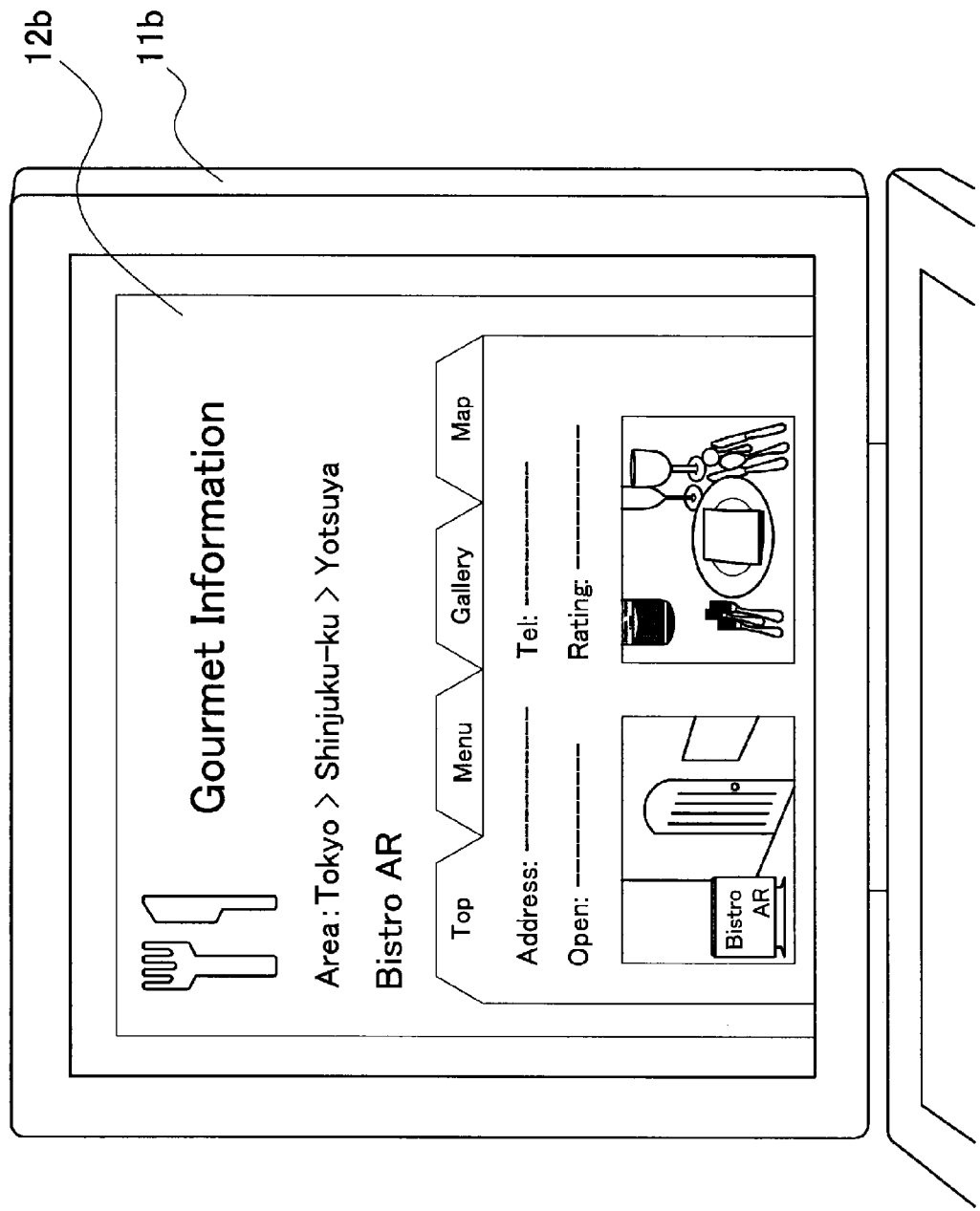
FIG. 5A is a diagram useful in explaining a second example of an object appearing in an input image.
Figure 5B:
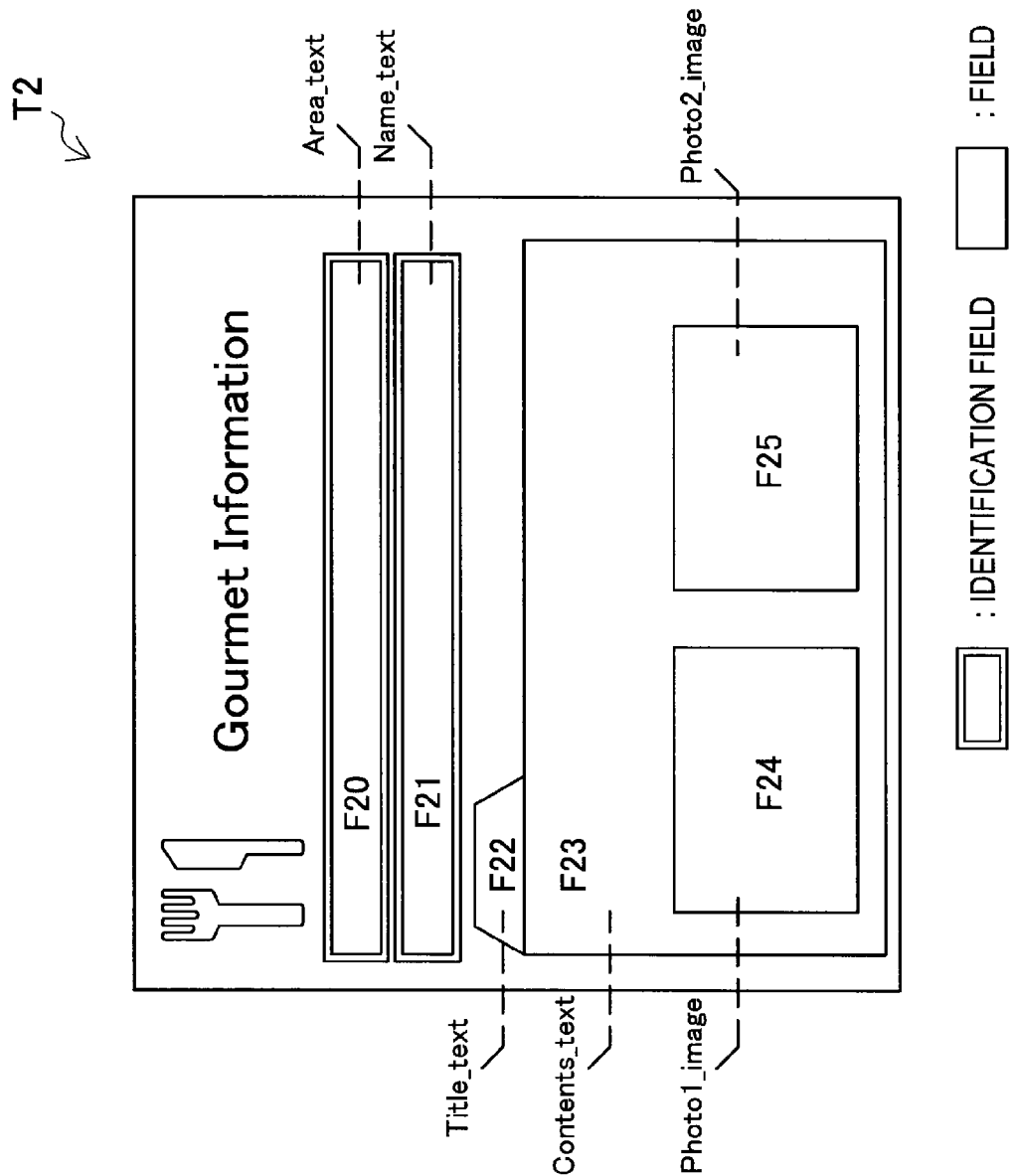
FIG. 5B is a diagram useful in explaining one example of a template corresponding to the object illustrated in FIG. 5A.

FIG. 5A is a diagram useful in explaining a second example of an object appearing in an input image. FIG. 5B is a diagram useful in explaining one example of a template corresponding to the object illustrated in FIG. 5A.

The object 12b shown in FIG. 5A is a web page for restaurant information displayed by an information appliance 11b present in the real world. The object 12b includes a heading of the web page, identification information that identifies a restaurant, and the content of the restaurant information.

The template T2 shown in FIG. 5B is a template expressing the visible structure of the object 12b that is a web page. The template T2 includes six fields F20 to F25. The field F20 (Area_text) is one identification field and is associated with a region name. The field F21 (Name_text) is another identification field and is associated with a restaurant name. The field F22 (Title_text) is a regular field and is associated with a heading character string. The field F23 (Contents_text) is a regular field and is associated with the content of the restaurant information. The field F24 (Photo1_image) and F25 (Photo2_image) are regular fields and are associated with image information. In this way, one template may include a plurality of identification fields. The fields included in the template may be associated with text information or may be associated with image information.

(2-3) Third Embodiment

Figure 6A:
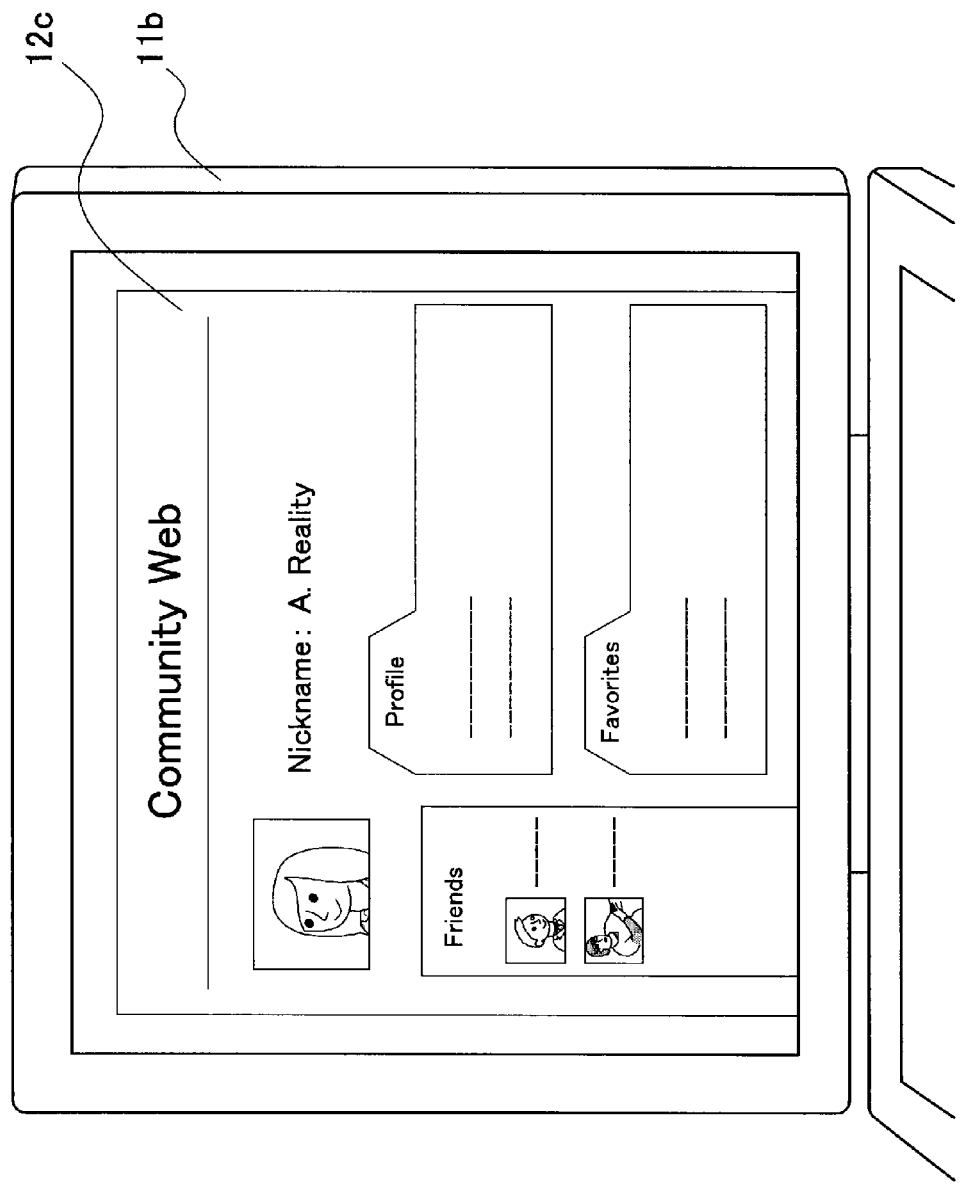
FIG. 6A is a diagram useful in explaining a third example of an object appearing in an input image.
Figure 6B:
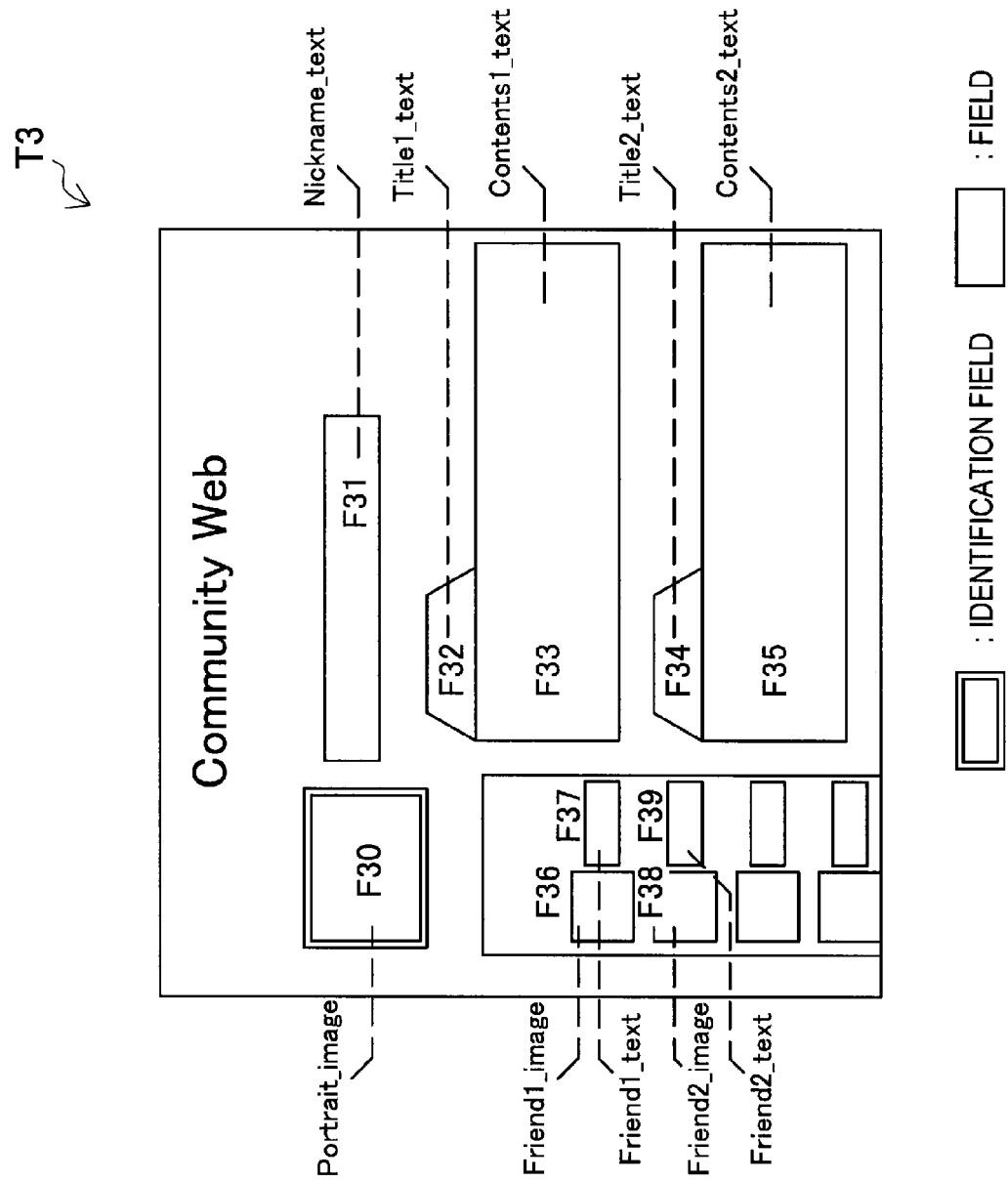
FIG. 6B is a diagram useful in explaining one example of a template corresponding to the object illustrated in FIG. 6A.

FIG. 6A is a diagram useful in explaining a third example of an object appearing in an input image. FIG. 6B is a diagram useful in explaining one example of a template corresponding to the object illustrated in FIG. 6A.

An object 12c shown in FIG. 6A is a web page for a social network displayed by the information appliance 11b present in the real world. The object 12c includes a heading of the web page, identification information that identifies a person, friend information, profile information, and the like.

The template T3 shown in FIG. 6B is a template expressing the visible structure of the object 12c that is a web page. The template T3 includes ten fields F30 to F39. The field F30 (Portrait_image) is an identification field and is associated with a face image of a person. The field F31 (Nickname_text) is a regular field and is associated with a nickname. The fields F32 (Title1_text) and F34 (Title2_text) are regular fields and are associated with heading character strings. The fields F33 (Contents1_text) and F35 (Contents2_text) are regular fields and are associated with the content of various information. The fields F36 (Friend1_image) and F38 (Friend2_image) are regular fields and are associated with face images of friends.

The fields F37 (Friend1_text) and F39 (Friend2_text) are regular fields and are associated with nicknames of friends. In this way, a field that is associated with image information out of the fields included in the template may be an identification field.

(3) Template Acquiring Unit

When image processing is carried out by the image processing apparatus 100, the template acquiring unit 130 acquires at least one of the templates described above that are stored in the template DB 125. The template acquiring unit 130 then outputs the acquired template(s) to the template matching unit 140.

(4) Template Matching Unit

The template matching unit 140 matches the input image acquired by the image acquiring unit 120 against the one or more templates acquired by the template acquiring unit 130. For example, the template matching unit 140 extracts edges from the input image. Next, the template matching unit 140 determines the degree of matching between the edges extracted from the input image and frames of the fields included in the templates while changing the position and posture of the respective templates in three dimensions. If a template for which the degree of matching exceeds a specified degree of matching is present, the template matching unit 140 then determines that the object corresponding to the template appears in the input image. The template matching unit 140 outputs the result of matching (as examples, an identifier, position, and posture of the matching template) to the recognition unit 150.

(5) Reference Image DB

The reference image DB 145 is a database storing existing images referred to by a field recognition process carried out by the recognition unit 150. As one example, the reference image DB 145 may store images produced by taking exterior photographs of restaurants in association with identifiers of the restaurants. The reference image DB 145 may also store face images of people in association with identifiers of such people. Note that the images referred to in the field recognition process carried out by the recognition unit 150 are not limited to such examples and may be other kinds of images.

(6) Recognition Unit

If one of the templates matches the input image, the recognition unit 150 recognizes information associated with the at least one field included in the matching template from the input image. As one example, by carrying out OCR (Optical Character Recognition) on fields associated with the text information, the recognition unit 150 recognizes text information associated with such fields. Also, by matching parts of the input image that correspond to fields associated with image information against the images stored by the reference image DB 145, the recognition unit 150 recognizes information associated with such fields. As one example, the recognition unit 150 may process the input image in keeping with the posture of the template that matches the input image so that the corresponding surface of the object directly faces the image pickup plane and then subject the processed input image to OCR or matching against existing images.

In the present embodiment, the recognition unit 150 identifies an object appearing in the input image based on information recognized from the input image using a template. As one example, if the template T1 illustrated in FIG. 4B matches the input image, the recognition unit 150 may identify, based on the station name read from the identification field F10, the station whose guidance notice board was recognized as the object appearing in the input image. As another example, if the template T2 illustrated in FIG. 5B matches the input image, the recognition unit 150 may identify, based on a region name and restaurant name read from the identification fields F20 and F21, the restaurant which is the subject of the web page recognized as the object appearing in the input image. As yet another example, if the template T3 illustrated in FIG. 6B matches the input image, the recognition unit 150 may identify, based on the result of matching a part of the image that corresponds to the identification field F30 with existing facial images, the person who is the subject of the web page recognized as the object appearing in the input image. Note that if sufficient information for identifying an object has been recognized from non-identification fields, the recognition unit 150 may identify the object based on such information.

The recognition of information associated with the respective fields by the recognition unit 150 does not always succeed. For example, if a position that corresponds to one or more fields in a template does not appear in the input image, the recognition unit 150 may not be able to recognize the information associated with such fields. Also, in a case where a part corresponding to certain fields appears small in the input image or a case where the surface of the object does not directly face the image pickup plane, it may be difficult to recognize the information associated with such fields. For this reason, to have the user adjust the composition of the input image, the recognition unit 150 outputs notification of success or failure of recognition of the information associated with the respective fields to the display control unit 160.

(7) Display Control Unit

The display control unit 160 displays the result of recognition for at least one field by the recognition unit 150 on the display of the display unit 110. For example, if an identification field does not appear in the input image, the display control unit 160 may have an indication for urging the user to move the image pickup unit 102 in the direction of such identification field displayed on the display so that the user can support the identification of an object by the recognition unit 150. Also, if the size of an identification field appearing in the input image is small, the display control unit 160 may display an indication on the display to urge the user to make the identification field larger in the picked-up image. After seeing such indication, the user may move the image pickup unit 102 or change the zoom ratio, thereby facilitating recognition of the information associated with the identification field. If recognition of information associated with an identification field has succeeded, the display control unit 160 may also guide the user to facilitate recognition of other fields aside from such identification field. For example, by overlaying an indication expressing whether recognition of the associated information succeeded or failed for each field on the input image, the display control unit 160 can guide the user so as to support recognition of fields for which recognition of the associated information failed.

Figure 7:
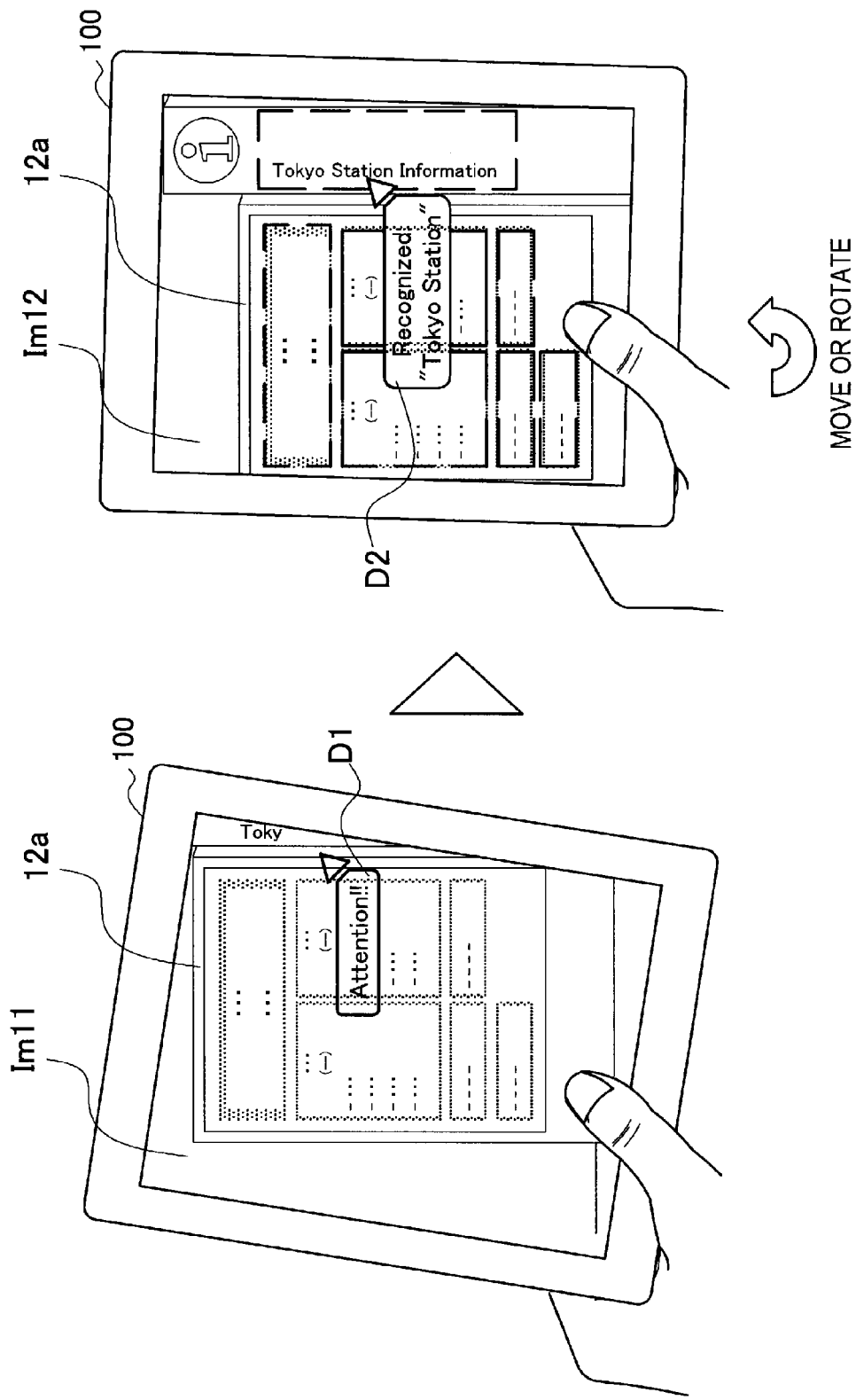
FIG. 7 is a diagram useful in explaining a first example of a displaying of a recognition result according to the same embodiment.

FIG. 7 is a diagram useful in explaining a first example of a displaying of a recognition result by the display control unit 160. On the left in FIG. 7, an image Im11 in which the object 12a appears is displayed on the display of the image processing apparatus 100. Here, the (part corresponding to the) identification field of the object 12a does not sufficiently appear in the image Im11. For this reason, the display control unit 160 overlays an indication D1 urging the user to position the identification field of the object 12a in the input image on the image Im11. On seeing such indication D1, the user may move or rotate the image processing apparatus 100 for example to position the identification field of the object 12a in the input image. On the right in FIG. 7, an indication D2 showing that identification of the object 12a based on the information recognized from the identification field succeeded is overlaid on the image Im12 in which the object 12a appears.

Figure 8A:
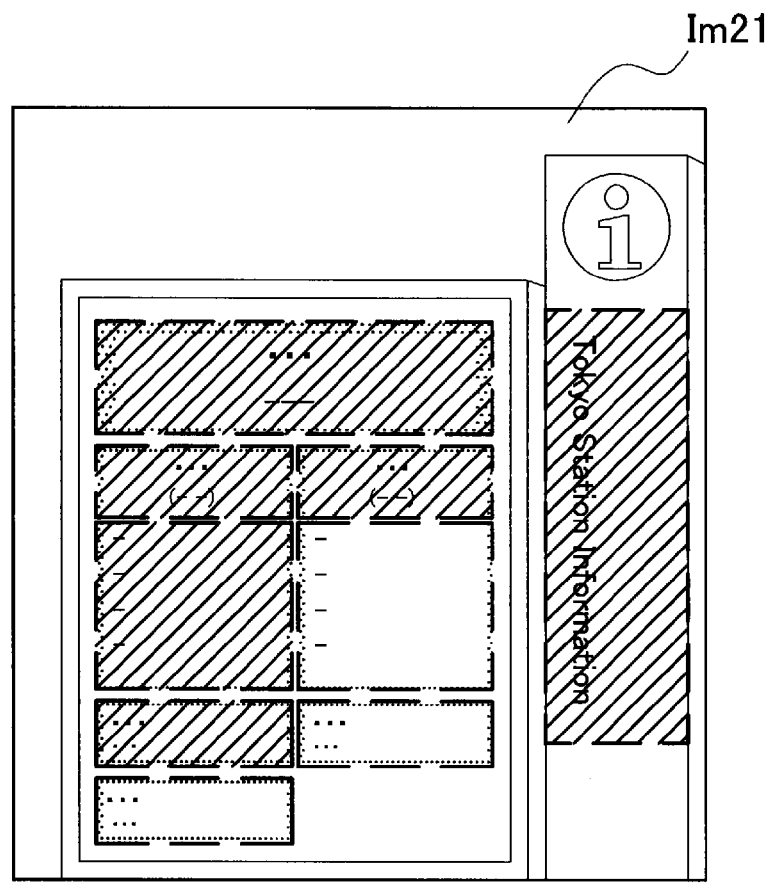
FIG. 8A is a diagram useful in explaining a second example of a displaying of a recognition result according to the same embodiment.
Figure 8A:
Figure 8A:
Figure 8B:
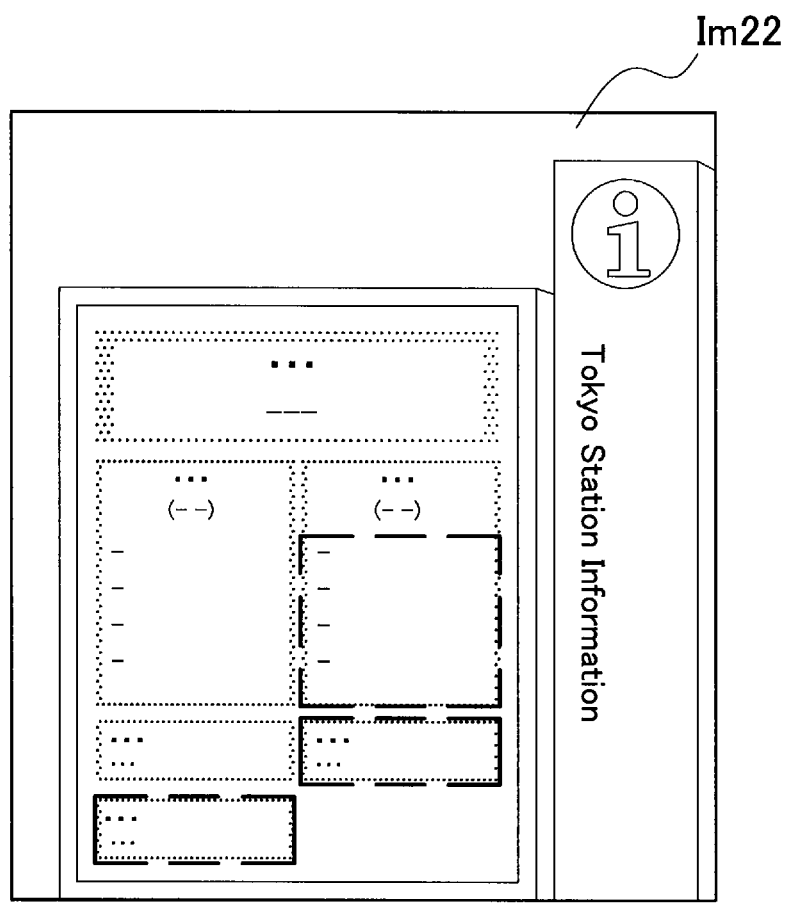
FIG. 8B is a diagram useful in explaining a third example of a displaying of a recognition result according to the same embodiment.

FIG. 8A is a diagram useful in explaining a second example of a displaying of a recognition result by the display control unit 160. In an image Im21 illustrated in FIG. 8A, semi-transparent rectangular indications are overlaid on fields where recognition of information has succeeded and transparent rectangular indications are overlaid on fields where recognition of information has failed. On seeing such indications, the user can operate the image processing apparatus 100 (or the image pickup unit 102) so that parts of the object corresponding to fields where the recognition of information failed appear larger or more clearly in the input image. FIG. 8B is a diagram useful in explaining a third example of a displaying of a recognition result by the display control unit 160. In the example in FIG. 8B, indications are not overlaid on fields where the recognition of information succeeded and transparent rectangular indications are overlaid only on fields where the recognition of information failed. In this case also, by removing the indications to inform the user of whether the recognition of information succeeded or failed, it is possible to guide the user so as to facilitate recognition of fields for which the recognition of information failed.

Figure 9:
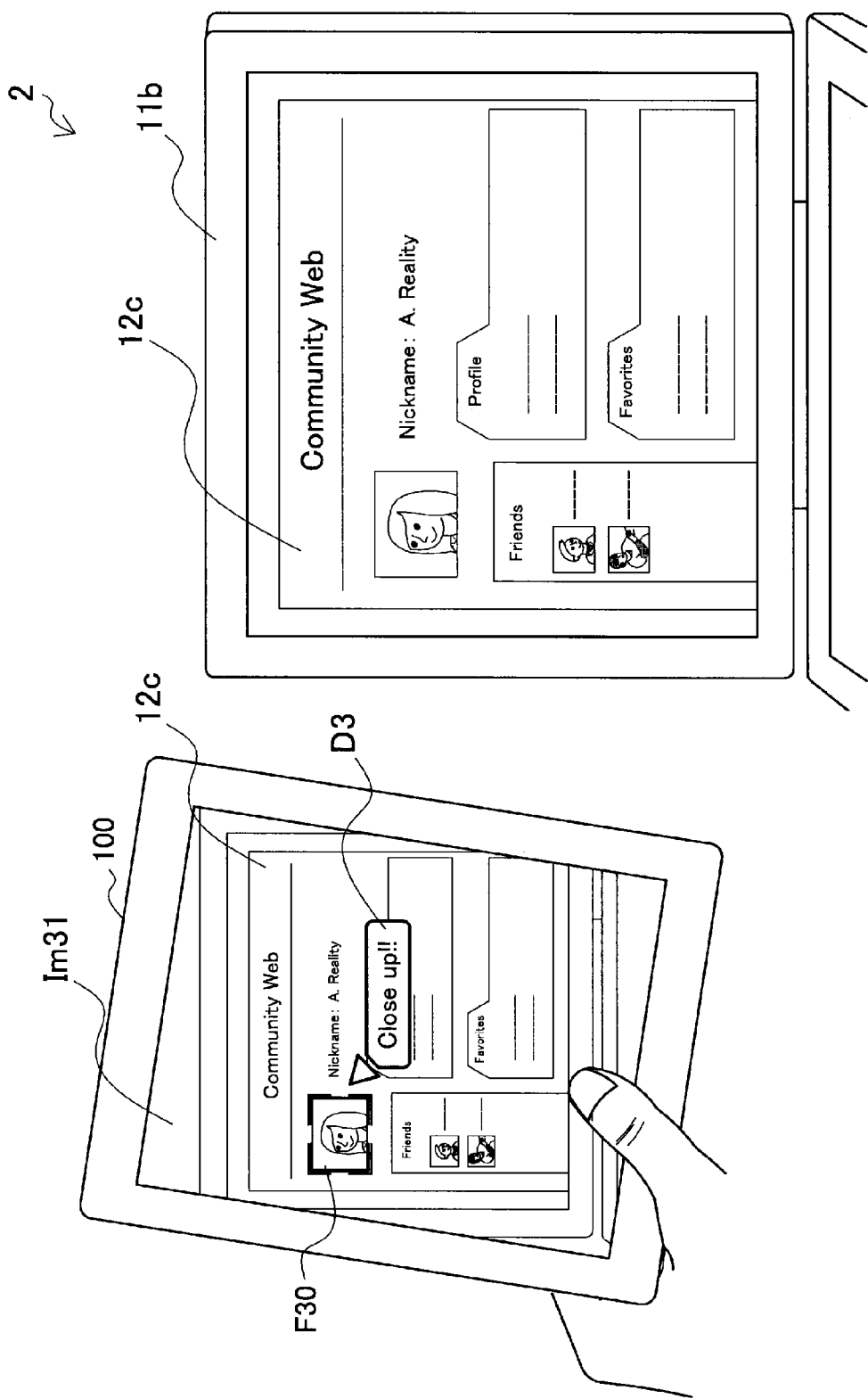
FIG. 9 is a diagram useful in explaining a fourth example of a displaying of a recognition result according to the same embodiment.

FIG. 9 is a diagram useful in explaining a fourth example of a displaying of a recognition result by the display control unit 160. An image Im31 in which the object 12c displayed by the information appliance 11b present in the real world 2 appears is displayed on the display of the image processing apparatus 100 shown in FIG. 9. Although (a part corresponding to) the identification field F30 of the object 12c appears in the image Im31, since such field is small, the recognition of information for the identification field F30 may fail. For this reason, the display control unit 160 overlays an indication D3 on the image Im31 to urge the user to make the identification field F30 appear larger in the input image. After seeing such indication D3, the user may move the image processing apparatus 100 closer to the information appliance 11b or change the zoom ratio for example so that the identification field F30 appears larger in the input image. By doing so, recognition of the information for the identification field F30 will succeed more reliably.

Figure 10:
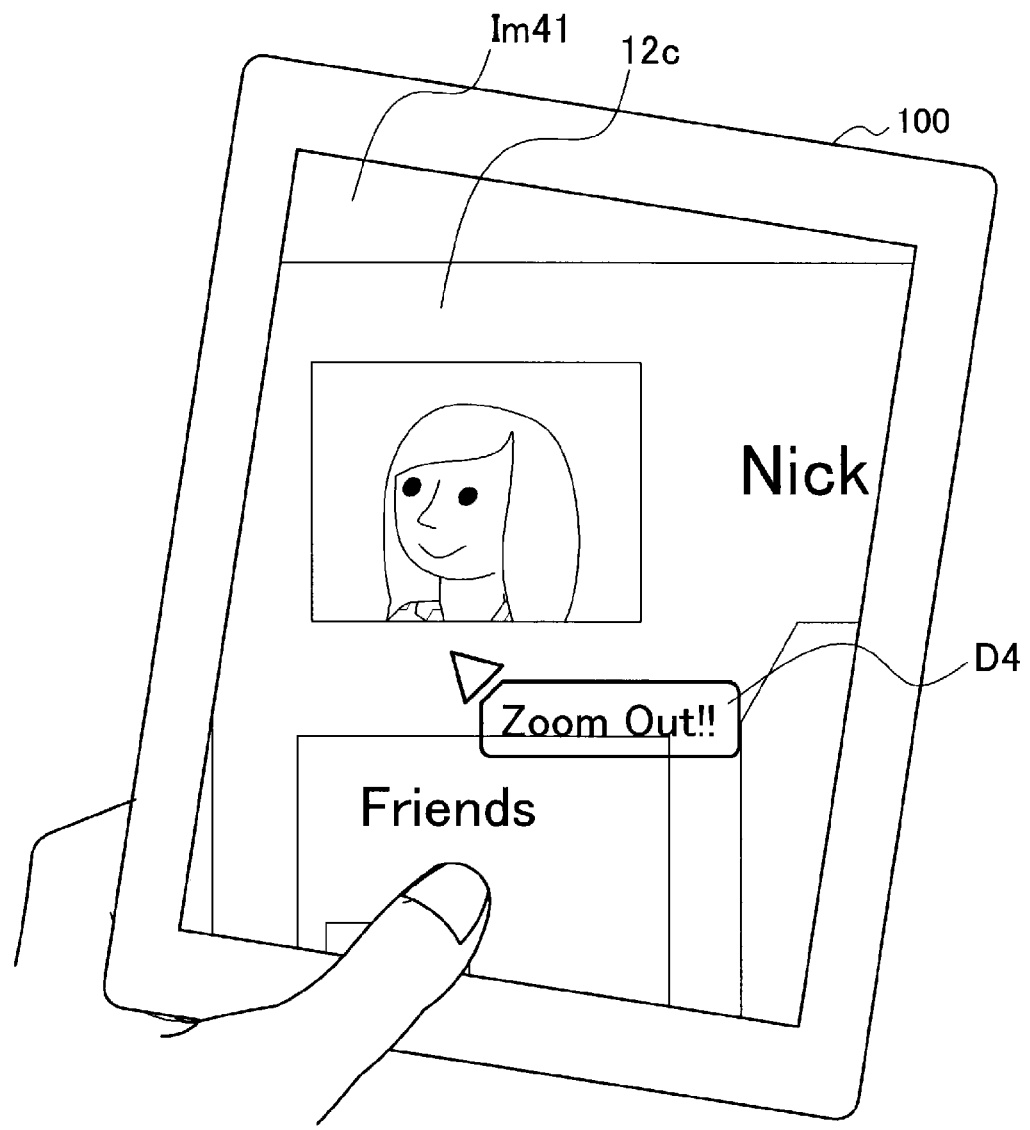
FIG. 10 is a diagram useful in explaining a fifth example of a displaying of a recognition result according to the same embodiment.

FIG. 10 is a diagram useful in explaining a fifth example of a displaying of a recognition result by the display control unit 160. An image Im41 in which the object 12c appears is displayed on the display of the image processing apparatus 100 shown in FIG. 10. Although the object 12c appears in the image Im41, since the size of the object 12c is too large, none of the templates matches the object 12c. For this reason, the display control unit 160 overlays an indication D4 on the image Im41 to urge the user to make the object 12c appear smaller in the input image. After seeing such indication D4, the user may make the entire object 12c appear in the input image so that the template T3 shown in FIG. 6B for example matches the object 12c appearing in the input image.

If identification of an object has succeeded through cooperation between the display control unit 160 and the user as described above or if all of the necessary information has been recognized by the recognition unit 150, execution of an AR application may commence. For example, the display control unit 160 causes the information acquiring unit 170 to acquire related information related to the object identified by the recognition unit 150. After this, the display control unit 160 displays the related information acquired by the information acquiring unit 170 on the display.

(8) Related Information DB

The related information DB 165 is a database storing various information to be displayed for an AR application. In the related information DB 165, each piece of related information is associated with one of the objects or information produced by visualizing one of the objects. The related information may be an annotation for an AR application, for example. If, for example, an associated object has been identified in the input image, the annotations may be overlaid on the input image so as to be disposed in a periphery of the object. Also, the related information may be image information that represents a higher-quality image of the associated object than the picked-up (input) image. As one example, if an object appearing in the input image is recognized, a higher-quality image of the object than the input image may be displayed on the display in place of the input image. The related information DB 165 may store related information dynamically acquired in accordance with the position of the image processing apparatus 100.

(9) Information Acquiring Unit

The information acquiring unit 170 acquires related information relating to the object identified by the recognition unit 150 from the related information DB 165 or an external server. The information acquiring unit 170 outputs the acquired related information to the display control unit 160 and has the display control unit 160 carry out a display process for an AR application. As one example, the related information acquired by the information acquiring unit 170 may include the annotations described earlier, image information, or information acquired from a website via the communication unit 112.

Figure 11:
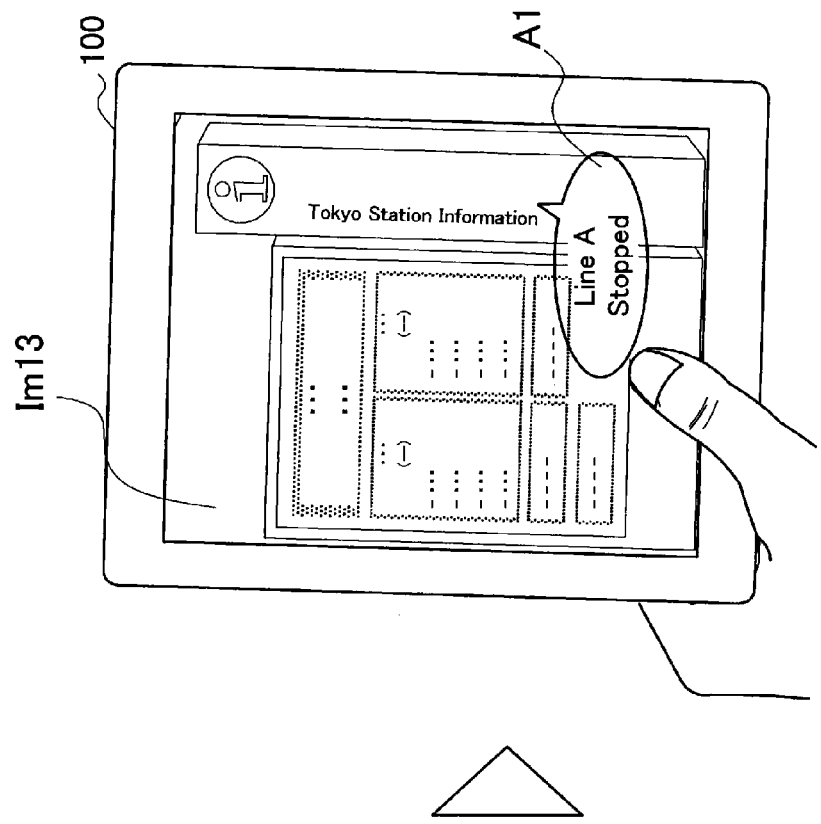
FIG. 11 is a diagram useful in explaining a first example of related information that can be displayed according to the same embodiment.
Figure 11:
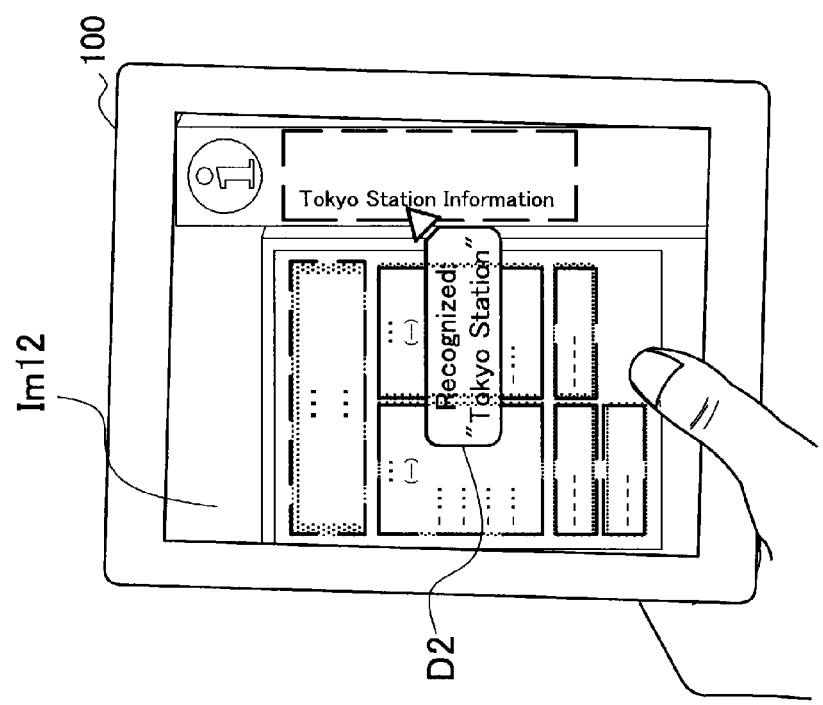

FIG. 11 is a diagram useful in explaining a first example of related information that may be displayed in the present embodiment. On the left in FIG. 11, the image Im12 illustrated in FIG. 7 is displayed on the display of the image processing apparatus 100. The indication D2 of the image Im12 shows that identification by the recognition unit 150 of the object 12a appearing the image Im12 succeeded. The object 12a is a notice board installed at Tokyo Station, for example. If identification of the object 12a has succeeded, the information acquiring unit 170 acquires related information relating to the object 12a. The display control unit 160 then overlays the related information acquired by the information acquiring unit 170 on the input image. On the right in FIG. 11, related information A1 is overlaid on an image Im13. As one example, the related information A1 is service information for trains that arrive at and depart from Tokyo Station.

Figure 12:
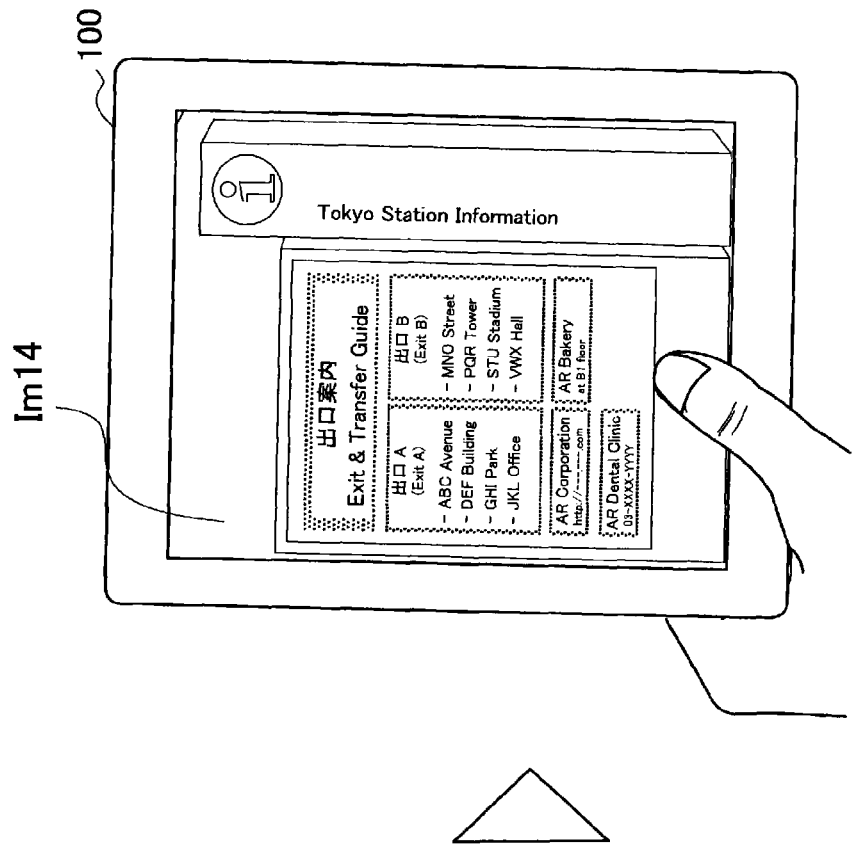
FIG. 12 is a diagram useful in explaining a second example of related information that can be displayed according to the same embodiment.
Figure 12:
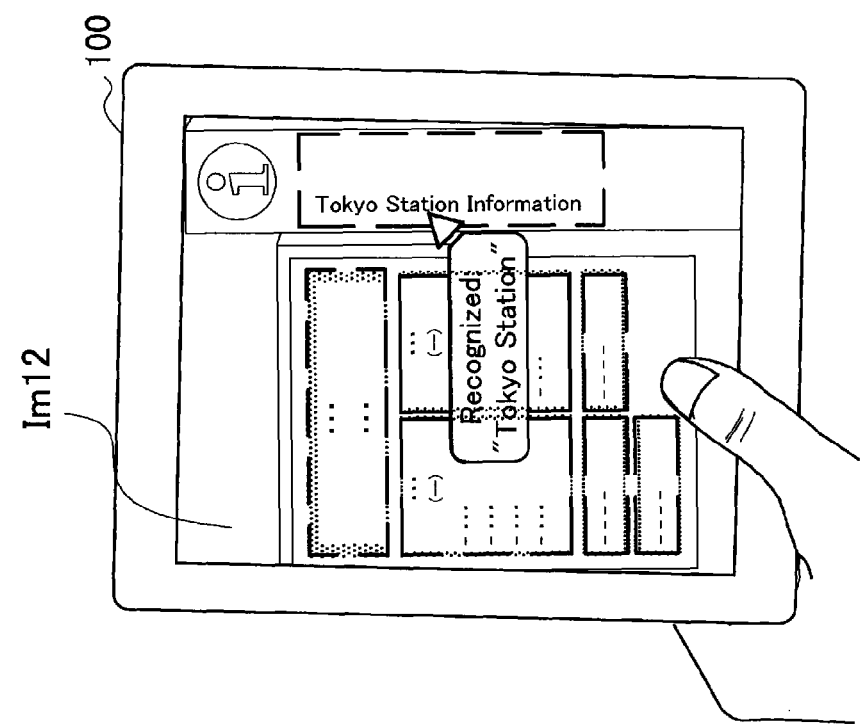

FIG. 12 is a diagram useful in explaining a second example of related information that may be displayed in the present embodiment. On the left in FIG. 12, the image Im12 illustrated in FIG. 7 is displayed on the display of the image processing apparatus 100. If identification of the object 12a has succeeded, the information acquiring unit 170 acquires image information that represents a higher-quality image of the object 12a as related information. The display control unit 160 then displays the higher-quality image of the object 12a in place of the input image using the image information inputted from the information acquiring unit 170. On the right in FIG. 12, a higher-quality image Im14 of the object 12a is displayed on the display of the image processing apparatus 100. The display control unit 160 may also overlay related information such as that illustrated in FIG. 11 on the image Im14.

Figure 13:
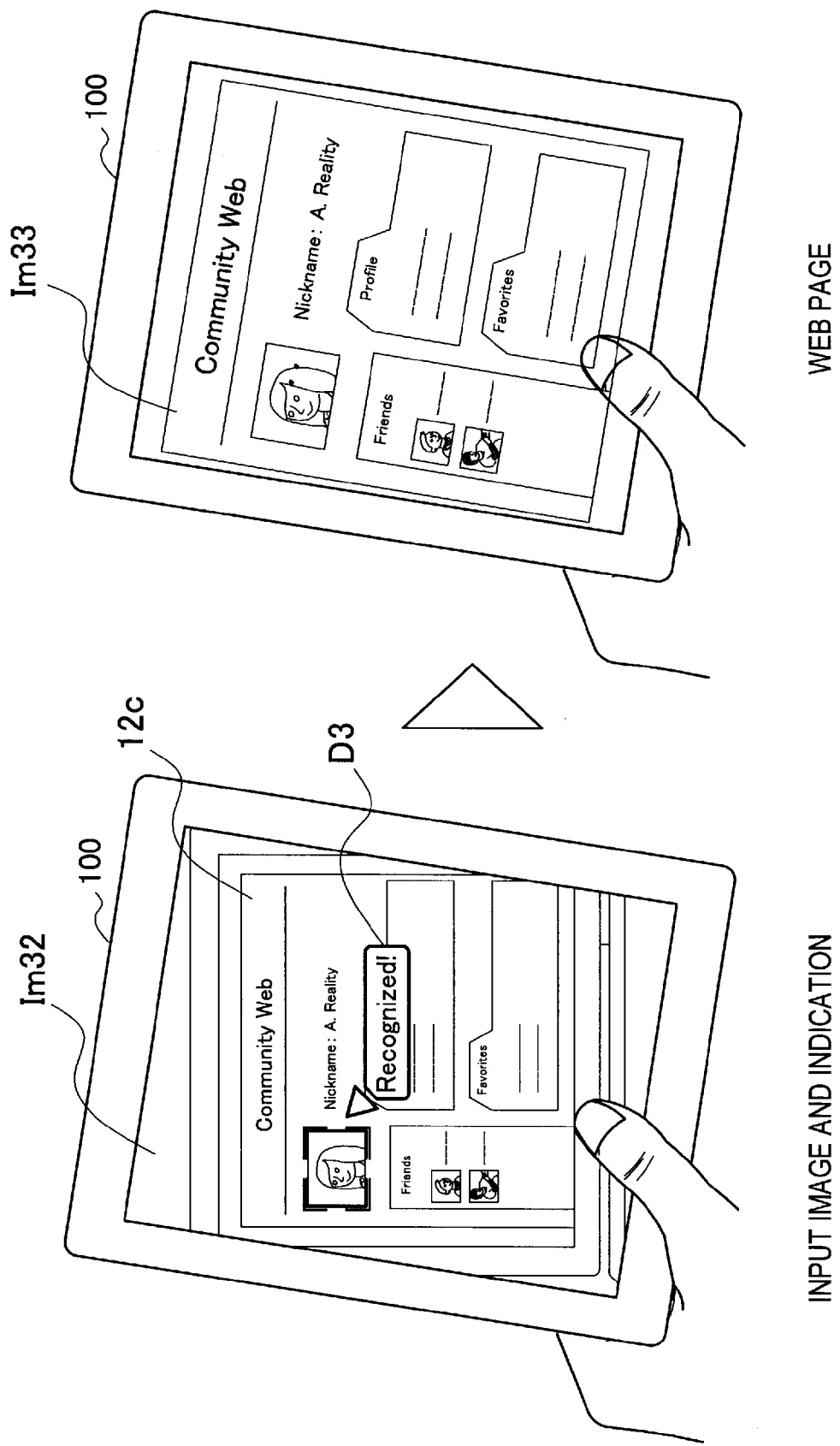
FIG. 13 is a diagram useful in explaining a third example of related information that can be displayed according to the same embodiment.

FIG. 13 is a diagram useful in explaining a third example of related information that may be displayed in the present embodiment. On the left in FIG. 13, an image Im32 in which the object 12c appears is displayed on the display of the image processing apparatus 100. The indication D3 in the image Im32 shows that recognition of the object 12c by the recognition unit 150 has succeeded. The object 12c is a web page providing personal information about a certain individual. If recognition of the object 12c has succeeded, the information acquiring unit 170 acquires related information related to the object 12c. The recognition of the object, for example, may include a facial recognition process that extracts an image of a face from the object 12c and compares the extracted facial image to a database of image data to identify the certain individual. Then, for example, the information acquiring unit 170 may transmit an HTTP (Hypertext Transfer Protocol) request that requests the transmission of a web page of the person identified by the recognition unit 150 to a web site for a social network to acquire the same web page as the object 12c. The display control unit 160 then displays the web page acquired by the information acquiring unit 170 on the display of the image processing apparatus 100. On the right in FIG. 13, an image Im33 of the web page is displayed. As another example, the recognition of an object may include recognizing login information for the website from the object 12c. Then, for example, the information acquiring unit 170 may transmit an HTTP (Hypertext Transfer Protocol) request that includes the login information identified by the recognition unit 150 to a web site to log into the web page. The display control unit 160 then displays the web page acquired by the information acquiring unit 170 on the display of the image processing apparatus 100.

Note that the information acquired by the information acquiring unit 170 from the web site does not need to be the web page itself. As one example, if a web page of an individual restaurant on a web site providing restaurant information has been identified, coupon information for the restaurant in question may be acquired.

2-3. Flow of Processing

Figure 14:
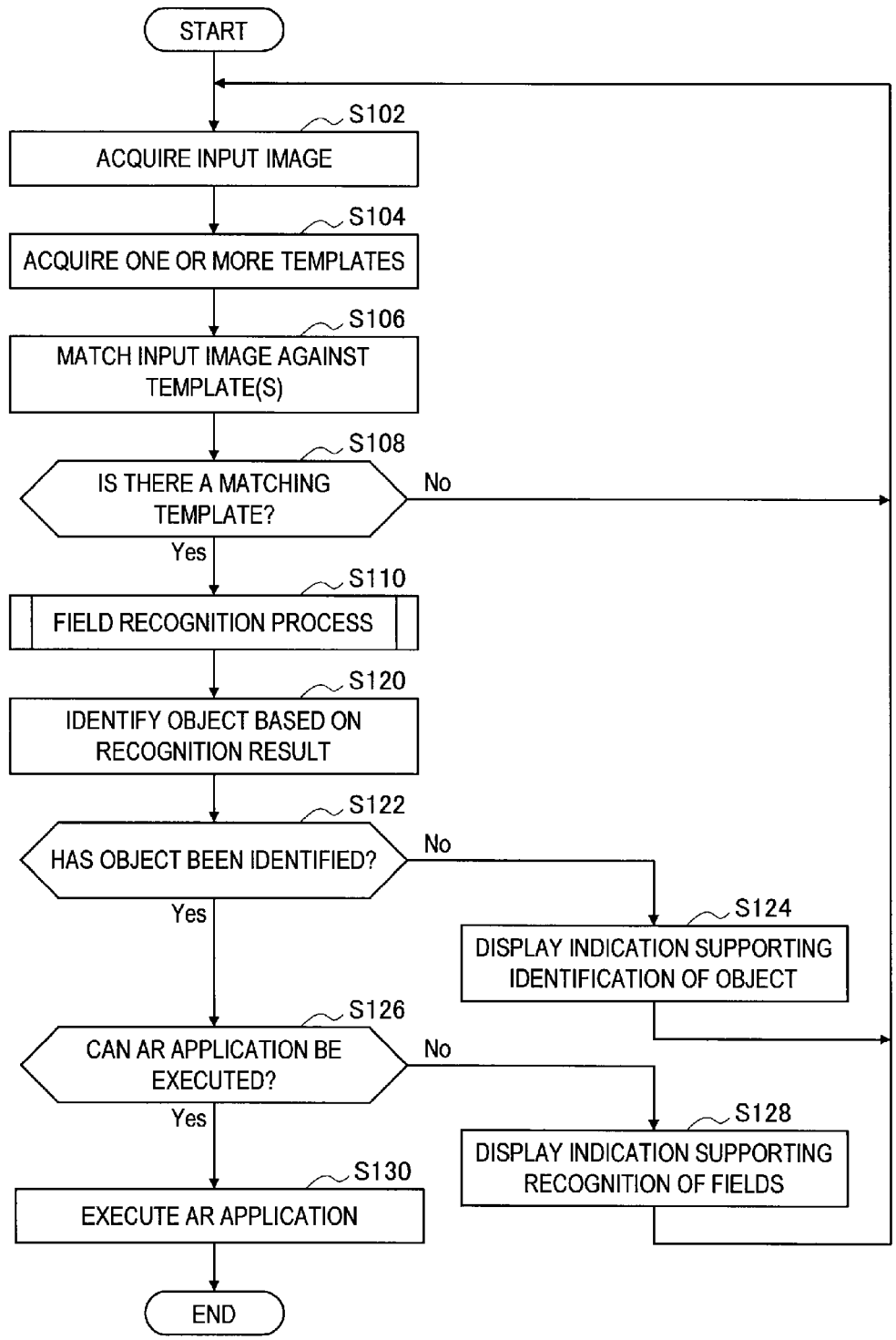
FIG. 14 is a flowchart showing one example of the flow of image processing according to the same embodiment.

FIG. 14 is a flowchart showing one example of the flow of image processing by the image processing apparatus 100 according to the present embodiment.

As shown in FIG. 14, first the image acquiring unit 120 acquires a picked-up image generated by the image pickup unit 102 as the input image (step S102). The image acquiring unit 120 then outputs the acquired input image to the template matching unit 140, the recognition unit 150, and the display control unit 160. Also, the template acquiring unit 130 acquires one or more templates stored by the template DB 125 during image processing by the image processing apparatus 100 (step S104). The template acquiring unit 130 then outputs the acquired template(s) to the template matching unit 140.

Next, the template matching unit 140 matches the input images inputted from the image acquiring unit 120 against the respective templates inputted from the template acquiring unit 130 (step S106). The template matching unit 140 then outputs the matching result to the recognition unit 150.

After this, the recognition unit 150 determines whether a template that matches the input image is present based on the matching result inputted from the template matching unit 140 (step S108). Here, if a template that matches the input image is not present, the processing returns to step S102 and the next input image may be acquired. Note that acquisition of templates in step S104 may be omitted in the next processing iteration.

If, in step S108, a template that matches the input image is present, the recognition unit 150 recognizes information associated with fields included in the matching template from the input image (step S110). The field recognition process carried out here will be described in more detail later. Next, the recognition unit 150 identifies an object appearing in the input image based on the information recognized from the input image using the template (step S120). The recognition unit 150 then outputs recognition results for the respective fields and an identification result for the object to the display control unit 160.

Next, the display control unit 160 determines whether an object appearing in the input image has been identified (step S122). Here, if an object appearing in the input image has not been identified, the display control unit 160 displays an indication guiding the user to facilitate recognition of identification fields on the display so as to support the identification of the object (step S124).

Meanwhile, if an object appearing in the input image has been identified, the display control unit 160 determines whether the preparation for execution of an AR application is complete (step S126). For example, in a case where it is not possible to execute the AR application if the recognition of information in fields aside from the identification field(s) does not succeed, it is possible, when the recognition of information of any of the fields does not succeed, to determine that the preparation for execution of an AR application is incomplete. In such case, the display control unit 160 displays an indication on the display to guide the user to facilitate recognition for fields aside from the identification field(s) (step S128).

If, in step S126, the preparation for execution of an AR application is complete, the AR application is executed (step S130). For example, related information related to the identified object is acquired by the information acquiring unit 170 and the acquired related information is displayed on the display by the display control unit 160.

Figure 15:
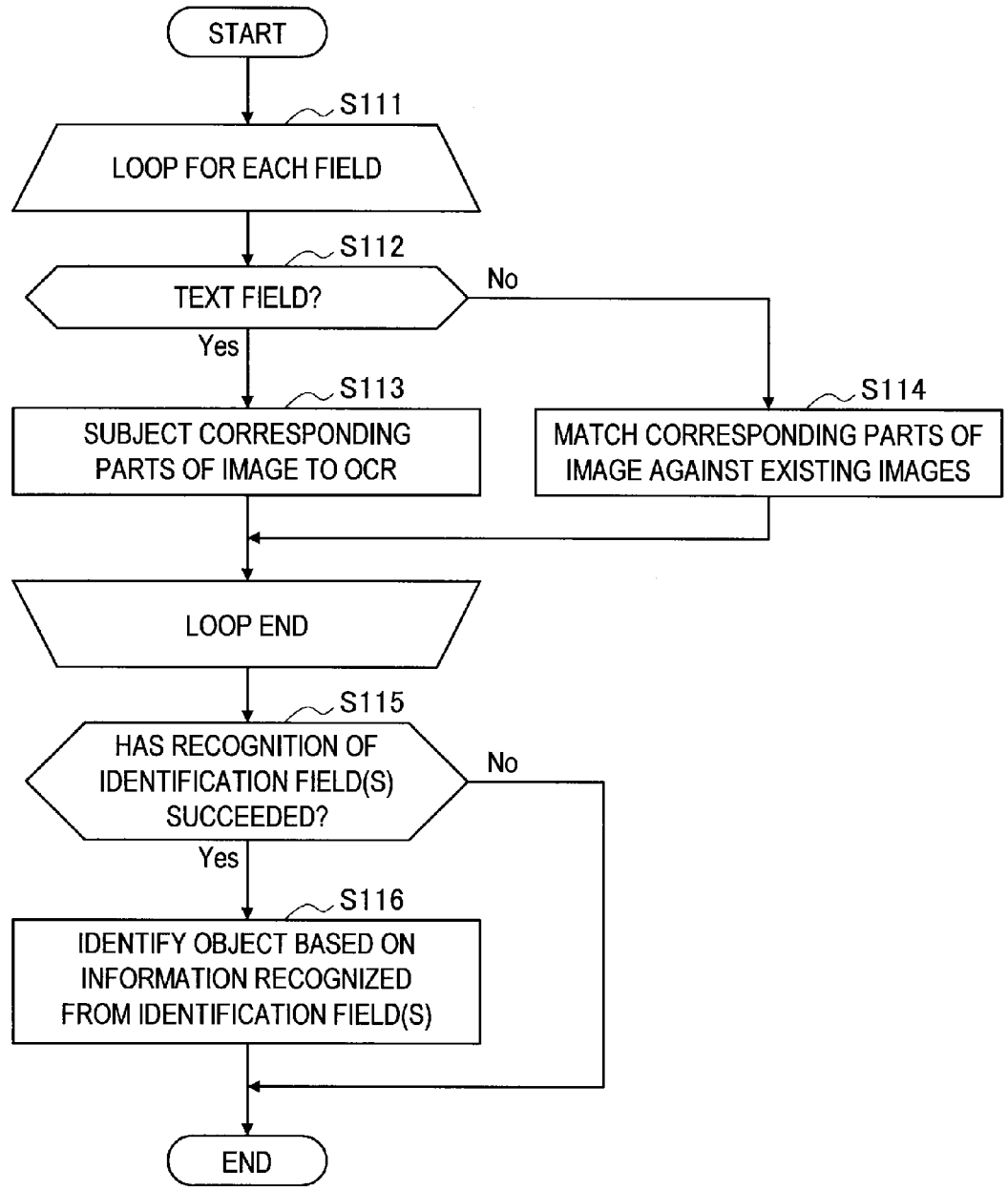
FIG. 15 is a flowchart showing one example of the detailed flow of a field recognition process shown in FIG. 14.

FIG. 15 is a flowchart showing one example of the detailed flow of the field recognition process carried out by the recognition unit 150 in step S110 in FIG. 14.

The processing in step S112 to step S114 in FIG. 15 is repeated for each field included in the template that matched the input image (step S111). First, the recognition unit 150 determines which of text information and image information is associated in the template with the field presently being processed (step S112). If the field being processed is associated with text information, the recognition unit 150 applies OCR to a part of the input image corresponding to such field and recognizes the text information associated with such field (step S113). Meanwhile, if the field being processed is associated with image information, the recognition unit 150 matches a part of the input image corresponding to such field against existing images stored in the reference image DB 145 to recognize the information associated with such field (step S114).

When the processing in step S112 to step S114 has been completed for each field included in the template that matches the input image, the recognition unit 150 determines that recognition has succeeded for the identification field(s) (step S115). Here, if recognition has succeeded for the identification field(s), the recognition unit 150 further identifies the object appearing in the input image based on the information recognized from the identification field(s) (step S116). The recognition unit 150 then outputs the recognition result for each field and the identification result for the object to the display control unit 160.

3. Conclusion

A preferred embodiment of the present disclosure has been described in detail with reference to FIG. 1 to FIG. 15. According to this embodiment of the present disclosure, an object appearing in an input image is detected using templates expressing the visible structure of objects in the real world and visualized information on such object is recognized for each field included in a template. When doing so, since the result of recognition for at least one field is displayed on a display, it is possible for the user to adjust the composition of the input image so that an AR application operates effectively. Accordingly, it is possible for an AR application to provide useful information to the user more reliably. In particular, by displaying not only whether identification of an object has succeeded but also intermediate results of recognition for the respective fields that are the premise for successful identification of an object, it becomes possible for the user to effectively support image processing by an AR application.

Also, according to the present embodiment, a template includes one or more identification fields associated with information capable of uniquely identifying an object. According to this configuration, a plurality of objects that have a shared visible structure and differ only in the content of provided information can be identified using a single template. By doing so, in a case where objects are identified out of a large number of objects, it is possible to reduce the load of defining templates and to avoid an excessive increase in the total amount of data used for templates. The user is also guided to facilitate recognition of identification fields of a template that matches the input image. Since it becomes easier for the identification of an object to succeed, it is possible to provide more opportunities for the user to enjoy the benefits (such as the provision of useful information) of an AR application.

According to the present embodiment, for fields associated with text information, it is possible to use OCR technology to recognize the information in such fields. Also, for fields associated with image information, it is possible to use existing image information to recognize the information in such fields. By switching between recognition methods for fields in this way, it is possible to identify a wide variety of objects using templates.

According to the present embodiment, it is possible to identify real objects present in the real world and also displayed objects that correspond to images displayed by an information appliance. For example, if the displayed object is a web page, based on the result of identifying the web page using a template, it is possible for an apparatus that has picked up the input image to easily acquire the web page appearing in the input image or information related to such web page. In other words, it is unnecessary to carry out a troublesome operation such as input of a URL or searching for the web page.

Note that some of the logical functions of the image processing apparatus 100 described earlier may be implemented at an apparatus present in a cloud computing environment instead of being implemented at the image processing apparatus itself. In this case, the information exchanged between the logical functions may be transmitted or received between apparatuses via the communication unit 112 illustrated in FIG. 12.

The series of control processes carried out by the respective apparatuses described in the present specification may be realized by software, hardware, or a combination of software and hardware. Programs that compose such software may be stored in advance for example on a storage medium provided inside or outside the respective apparatuses. As one example, during execution, such programs are written into RAM (Random Access Memory) and executed by a processor such as a CPU.

Although a preferred embodiment of the present disclosure has been described above with reference to the attached drawings, the technical scope of the present disclosure is not limited to such embodiment.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing system comprising: one or more processing units that: acquire an image captured by an image pickup unit; acquire one or a plurality of templates each including one or a plurality of fields; compare the image to the one or plurality of templates; and output a result based on the comparison, the result indicating whether recognition of each of the one or plurality of fields of the one or plurality of templates was successful.

(2) The information processing system of (1), wherein the image includes an object and the one or more processing units recognize a structure of the object.

(3) The information processing system of (2), wherein the one or more processing units recognize a structure of the object by detecting one or more fields included in the object.

(4) The information processing system of any of (1) to (3), wherein the one or more processing units extract edges from the image.

(5) The information processing system of (4), wherein the one or more processing units compare the image to the one or plurality of templates by determining a degree of matching between the edges extracted from the image and frames of fields included in the one or plurality of templates.

(6) The information processing system of any of (4) to (5), wherein the one or more processing units compare the image to the one or plurality of templates by determining a degree of matching between the edges extracted from the image and frames of fields included in the one or plurality of templates while changing a position of the one or plurality of templates.

(7) The information processing system of any of (4) to (6), wherein the one or more processing units compare the image to the one or plurality of templates by determining a degree of matching between the edges extracted from the image and frames of fields included in the one or plurality of templates while changing a posture of the one or plurality of templates.

(8) The information processing system of any of (1) to (7), wherein the one or more processing units recognize information associated with at least one field included in a matching template from the image.

(9) The information processing system of (8), wherein the at least one field is a field selected based on recognizing the matching template.

(10) The information processing system of any of (1) to (9), wherein the one or more processing units recognize information associated with at least one field included in a matching template from the image by performing optical character recognition (OCR) on a portion of the image associated with the at least one field.

(11) The information processing system of any of (1) to (10), wherein the one or more processing units recognize information associated with at least one field included in a matching template from the image by matching portions of the image associated with the at least one field with stored image information.

(12) The information processing system of any of (1) to (11), wherein the image associated with the at least one field is an image of a face, and the image of the face is matched with stored face image information.

(13) The information processing system of any of (1) to (8), wherein the one or more processing units control a display to superimpose the recognized information on the image.

(14) The information processing system of any of (1) to (13), wherein the one or more processing units generate assistance information for guiding a user of the image pickup unit to adjust the image pickup unit based on a result of the comparing.

(15) The information processing system of (14), wherein the assistance information instructs the user to change an orientation of the image pickup unit.

(16) The information processing system of any of (14) to (15), wherein the assistance information instructs the user to change at least one of a position and setting of the image pickup unit to change a size of the image captured by the image pickup unit.

(17) The information processing system of any of (1) to (16), wherein the result that is output based on the comparison includes controlling a display to display one or a plurality of fields for which recognition was successful differently from one or a plurality of fields for which recognition was not successful.

(18) The information processing system of any of (1) to (17), wherein the captured image and the one or plurality of templates correspond to a web page.

(19) The information processing system of (18), wherein the one or more processing units recognize information associated with at least one field included in a matching template corresponding to the web page from the image.

(20) The information processing system of (19), wherein the one or more processing units controls a process of accessing the web page based on the recognized information.

(21) The information processing system of any of (19) to (20), wherein the recognized information corresponds to login information for the web page.

(22) The information processing system of any of (1) to (21), wherein the information processing system is a mobile phone and the one or more processing units are a processor at the mobile phone.

(23) The information processing system of any of (1) to (22), wherein the information processing system includes a client and a server.

(24) The information processing system of any of (23), wherein the client includes the image pickup unit; and a first communication interface that sends the image to the server; and the server includes a second communication interface that receives the image from the client; at least one of the one or more processing units that acquires the one or a plurality of templates from a memory, compares the image to the one or plurality of templates, and controls the second communication interface to output the result based on the comparison to the client. (25) An information processing method performed by an information processing system, the method comprising: acquiring an image captured by an image pickup unit; acquiring one or a plurality of templates each including one or a plurality of fields; comparing the image to the one or plurality of templates; and outputting a result based on the comparison, the result indicating whether recognition of each of the one or plurality of fields of the one or plurality of templates was successful.

(26) A non-transitory computer-readable medium including computer program instructions, which when executed by an information processing system, cause the information processing system to perform a method, the method comprising: acquiring an image captured by an image pickup unit; acquiring one or a plurality of templates each including one or a plurality of fields; comparing the image to the one or plurality of templates; and outputting a result based on the comparison, the result indicating whether recognition of each of the one or plurality of fields of the one or plurality of templates was successful.

REFERENCE SIGNS LIST

100 Image processing apparatus
120 Image acquiring unit
130 Template acquiring unit
140 Template matching unit
150 Recognition unit
160 Display control unit
170 Information acquiring unit
T1, T2, T3 Templates

The invention claimed is:

1. An information processing system comprising:
one or more processing circuits configured to:
acquire an image captured by an image pickup unit;
acquire one or a plurality of templates each including one or a plurality of fields;
perform a comparison of the image to the one or plurality of templates; and
output augmented reality content related to a result based on the comparison, the result indicating whether recognition of each of the one or plurality of fields of the one or plurality of templates was successful,
wherein the result that is output based on the comparison includes controlling a display to display one or a plurality of fields for which recognition was successful differently from one or a plurality of fields for which recognition was not successful.

2. The information processing system of claim 1, wherein the image includes an object and the one or more processing circuits are configured to recognize a structure of the object.

3. The information processing system of claim 2, wherein the one or more processing circuits are configured to recognize a structure of the object by detecting one or more fields included in the object.

4. The information processing system of claim 1, wherein the one or more processing circuits are configured to extract edges from the image.

5. The information processing system of claim 4, wherein the one or more processing circuits are configured to compare the image to the one or plurality of templates by determining a degree of matching between the edges extracted from the image and frames of fields included in the one or plurality of templates.

6. The information processing system of claim 4, wherein the one or more processing circuits are configured to compare the image to the one or plurality of templates by determining a degree of matching between the edges extracted from the image and frames of fields included in the one or plurality of templates while changing a position of the one or plurality of templates.

7. The information processing system of claim 4, wherein the one or more processing circuits are configured to compare the image to the one or plurality of templates by determining a degree of matching between the edges extracted from the image and frames of fields included in the one or plurality of templates while changing a posture of the one or plurality of templates.

8. The information processing system of claim 1, wherein the one or more processing circuits are configured to recognize information associated with at least one field included in a matching template from the image.

9. The information processing system of claim 8, wherein the at least one field is a field selected based on recognizing the matching template.

10. The information processing system of claim 8, wherein the one or more processing circuits are configured to control a display to superimpose the recognized information on the image.

11. The information processing system of claim 1, wherein the one or more processing circuits are configured to recognize information associated with at least one field included in a matching template from the image by performing optical character recognition (OCR) on a portion of the image associated with the at least one field.

12. The information processing system of claim 1, wherein the one or more processing circuits are configured to recognize information associated with at least one field included in a matching template from the image by matching portions of the image associated with the at least one field with stored image information.

13. The information processing system of claim 1, wherein the image associated with at least one field is an image of a face, and the image of the face is matched with stored face image information.

14. The information processing system of claim 1, wherein the one or more processing circuits are configured to generate assistance information for guiding a user of the image pickup unit to adjust the image pickup unit based on a result of the comparison.

15. The information processing system of claim 14, wherein the assistance information instructs the user to change an orientation of the image pickup unit.

16. The information processing system of claim 14, wherein the assistance information instructs the user to change at least one of a position and setting of the image pickup unit to change a size of the image captured by the image pickup unit.

17. The information processing system of claim 1, wherein the captured image and the one or plurality of templates correspond to a web page.

18. The information processing system of claim 17, wherein the one or more processing circuits are configured to recognize information associated with at least one field included in a matching template corresponding to the web page from the image.

19. The information processing system of claim 18, wherein the one or more processing circuits are configured to control a process of accessing the web page based on the recognized information.

20. The information processing system of claim 18, wherein the recognized information corresponds to login information for the web page.

21. The information processing system of claim 1, wherein the information processing system is a mobile phone and the one or more processing units are a processor of the mobile phone.

22. The information processing system of claim 1, wherein the information processing system includes a client and a server.

23. The information processing system of claim 22, wherein the client includes
the image pickup unit; and
a first communication interface configured to send the image to the server; and
the server includes
a second communication interface configured to receive the image from the client;
at least one of the one or more processing circuits are configured to acquire the one or a plurality of templates from a memory, compare the image to the one or plurality of templates, and control the second communication interface to output the result based on the comparison to the client.

24. An information processing method performed by an information processing system, the method comprising:
acquiring an image captured by an image pickup unit;
acquiring one or a plurality of templates each including one or a plurality of fields;
performing a comparison of the image to the one or plurality of templates; and
outputting augmented reality (AR) content related to a result based on the comparison, the result indicating whether recognition of each of the one or plurality of fields of the one or plurality of templates was successful,
wherein the result that is output based on the comparison includes controlling a display to display one or a plurality of fields for which recognition was successful differently from one or a plurality of fields for which recognition was not successful.

25. A non-transitory computer-readable medium including a set of computer-executable instructions, which when executed by an information processing system, cause the information processing system to perform a method, the method comprising:
acquiring an image captured by an image pickup unit;
acquiring one or a plurality of templates each including one or a plurality of fields;
performing a comparison of the image to the one or plurality of templates; and
outputting augmented reality content related to a result based on the comparison, the result indicating whether recognition of each of the one or plurality of fields of the one or plurality of templates was successful,
wherein the result that is output based on the comparison includes controlling a display to display one or a plurality of fields for which recognition was successful differently from one or a plurality of fields for which recognition was not successful.

* * * * *